United States Patent
Kishigami et al.

(10) Patent No.: US 7,088,956 B2
(45) Date of Patent: Aug. 8, 2006

(54) PATH SEARCH CIRCUIT, RADIO RECEIVER AND RADIO TRANSMITTER, UTILIZING A DIRECTIONAL BEAM

(75) Inventors: Takaaki Kishigami, Kanagawa (JP); Takashi Fukagawa, Kanagawa (JP); Yasuaki Yuda, Kanagawa (JP); Keiji Takakusaki, Kanagawa (JP); Shoji Miyamoto, Miyagi (JP)

(73) Assignee: Matsushita Electric Industrial Co., Ltd.

( * ) Notice: Subject to any disclaimer, the term of this patent is extended or adjusted under 35 U.S.C. 154(b) by 443 days.

(21) Appl. No.: 10/411,344

(22) Filed: Apr. 10, 2003

(65) Prior Publication Data

US 2003/0228887 A1 Dec. 11, 2003

(30) Foreign Application Priority Data

Apr. 12, 2002 (JP) .............................. 2002-110184
Jul. 26, 2002 (JP) .............................. 2002-217875

(51) Int. Cl.
*H04B 1/00* (2006.01)
*H04B 15/00* (2006.01)

(52) U.S. Cl. ...................... 455/65; 455/562.1; 455/506; 455/63.1; 455/67.13; 455/114.2; 455/143; 455/296; 375/147; 375/347; 375/340; 375/343; 342/383; 342/380; 370/342

(58) Field of Classification Search ................ 375/147, 375/347, 349, 340, 325, 343; 342/383, 380; 455/65, 506, 562.1, 63.1, 67.13, 114.2, 143, 455/296
See application file for complete search history.

(56) References Cited

U.S. PATENT DOCUMENTS 6,191,736 B1 * 2/2001 Yukitomo et al. .......... 342/383
6,466,166 B1 * 10/2002 Nakagawa .................. 342/378
6,492,958 B1 * 12/2002 Yoshida ..................... 343/853
6,628,698 B1 * 9/2003 Oda .......................... 375/147
6,650,692 B1 * 11/2003 Inoue et al. ................ 375/147
6,657,590 B1 * 12/2003 Yoshida ..................... 342/383
6,879,624 B1 * 4/2005 Sano ......................... 375/147

FOREIGN PATENT DOCUMENTS

EP 1 069 708 A2 1/2001

(Continued)

OTHER PUBLICATIONS

"Unitary ESPRIT: How to Obtain Increased Estimation Accuracy with a Reduced Computational Burden," by M. Haardt, et al., pp. 1232-1242, IEEE Transactions on Signal Processing, vol. 43, No. 5, May 1995.

(Continued)

*Primary Examiner*—Marceau Milord
(74) *Attorney, Agent, or Firm*—RatnerPrestia

(57) ABSTRACT

A path search circuit according to the present invention has an orthogonal multi-beam forming section 4 for directional reception with a plurality of orthogonal multi-beams orthogonal one to another, correlation-operating sections 61–6M for correlation-operating outputs of the orthogonal multi-beam forming section 4 with a known signal, weight multiplying sections 81–8Nb for multiplying the output of the correlation-operating section 61–6M by a weight converted into a beam space, delay profile generating sections 91–9Nb for generating delay profiles from the output signals of the weight multiplying sections 81–8Nb, and a path detecting section 10 for detecting a reception timing and arrival direction of arrival path from the delay profile. This path search circuit can enhance the accuracy of path direction detection by the use of a directional reception signal, and further reduce the direction dependence of path timing detection accuracy.

38 Claims, 14 Drawing Sheets

FOREIGN PATENT DOCUMENTS

| | | |
|---|---|---|
| EP | 1 161 001 A2 | 12/2001 |
| EP | 1 170 878 A1 | 1/2002 |
| EP | 1 265 377 A2 | 12/2002 |
| GB | 2 349 045 A | 10/2000 |
| JP | 10-107723 | 4/1998 |
| JP | 2001-086049 | 3/2001 |
| JP | 2001-345747 | 12/2001 |

OTHER PUBLICATIONS

"Sensor-Array Calibration Using a Maximum-Likelihood Approach," by B. Chong, et al., pp. 827-835, IEEE Transactions on Antennas and Propagation, vol. 44, No. 6, Jun. 1996.

T. Inoue et al. "Two-Dimensional Rake Reception Scheme for DS/CDMA Systems In Beam Space Digital Beam Forming Antenna Configuration", IEICE Transactions on Communications, Institute of Electronics Information and Comm. Eng., Tokyo, JP, vol. E81-B, No. 7, Jul. 1, 1998, pp. 1374-1383.

European Search Report corresponding to application No. EP 03 00 7867 dated Nov. 27, 2003.

\* cited by examiner

RELATED ART

PATH SEARCH CIRCUIT, RADIO RECEIVER AND RADIO TRANSMITTER, UTILIZING A DIRECTIONAL BEAM

FIELD OF THE INVENTION

The present invention relates to a path search circuit, radio receiver and radio transmitter concerned with detection of a path direction and timing in a radio base station apparatus having antennas, such as array antennas, for use in a digital radio communication system.

BACKGROUND OF THE INVENTION

The signal, to be received by a base station apparatus, suffers interference with various signals, causing the deterioration in reception quality. There is known an adaptive array antenna as an art of suppressing the interference and receiving strongly only the signal arriving in a desired direction. In the adaptive array antenna, the weighting coefficient for multiplied on a reception signal (hereinafter, the weighting coefficient is referred to as "weight") is adjusted to regulate the amplitude and phase for provision to the reception signal, thereby making it possible to receive strongly only the signal arriving in a desired direction.

Meanwhile, the radio receiver requires a path timing detector circuit (hereinafter, referred to as "path search circuit") to detect a reception timing of a desired signal. By combining this with the adaptive array antenna art, further correct detection of reception timing is made possible. Incidentally, reception timing is got by, for example, detecting the timing of the correlating peak obtained by the mutual correlating operation with a predetermined signal.

There is, as a conventional adaptive array antenna device having a path search circuit, a disclosure in JP-A-2001-345747. FIG. 14 is a block diagram showing a configuration of a direct-spread CDMA schemed receiver having a conventional adaptive array. In the below, explanation is made on the operation by using FIG. 14. The RF signal, received at antenna elements 1411–141N in the number of n shown in FIG. 14, is sent to the respective radio receiving sections 1421–142N of the antenna elements. In the radio receiving sections 1421–142N, respectively these RF signals are frequency-converted into intermediate frequency (IF band) and amplified by not-shown automatic gain amplifiers.

Furthermore, after orthogonal detection into an I/Q-channel base band signal by the not-shown orthogonal detector, a not-shown A/D converter converts into and outputs a digital signal. Beam-forming sections 1441–1444, because of direct-spread CDMA receivers for the base band signal received at the antenna elements 1411–141N, multiply a code correlating value process output of a not-shown desired wave signal by a plurality of orthogonal beam weights orthogonal one to another. By multiplying beam weights in the beam-forming sections 1441–1444 and thereafter combining them, phase correction is made between the output of the antenna elements 1411–141N.

Due to this, the beam-forming sections 1441–1444 can generate respectively one beams and output them to the corresponding delay profile generating sections 1451–1454. On the basis of the beams a-d outputted from the beam-forming sections 1441–1444, the delay profile generating sections 1451–1454 generate a delay profiles and output them to a path detecting section 1460. Incidentally, the delay profiles represents the status of multipath propagation which is a representation of reception level of arriving path on a delay time axis.

The path detecting section 1460 detects an effective path out of the beam-based delay profiles and notifies a finger section of its timing and beam number.

By the above operation, it is made possible to implement communications with a desired communication area segmented into a plurality of beams and to mitigate the interference of a beam communication signal from other users. By detecting a reception timing after reducing the affection by an interfering user, the accuracy can be improved.

However, in the conventional receiver employing the above configuration, in the case that there is an arrival of a mobile terminal (hereinafter, referred to as "desired user") radio wave to be intentionally caught by the base station in an intermediate direction of the directional beams due to a plurality of orthogonal beam weights, the directional gain deteriorates and the interference components are not fully suppressed. In this manner, there is a problem of causing a direction dependence that reception-timing detection accuracy varies depending upon an arriving direction of a desired user's radio wave.

The present invention has been made in view of such points, and it is an object to provide a path search circuit which reduces the direction dependence of detection accuracy during path reception timing detection of a desired user's radio wave.

SUMMARY OF THE INVENTION

A path search circuit of the present invention is a path search circuit comprising: an orthogonal multi-beam forming section for multiplying a plurality of base band signals obtained by demodulating a plurality of radio-frequency signals received by a plurality of antennas respectively in a plurality of radio receiving sections by a first weight concerned with a plurality of mutually orthogonal directivities; a correlation operating section for correlation-operating outputs of the orthogonal multi-beam forming section with a predetermined signal; a weight multiplying section for multiplying an output of the correlation operating section by a second weight; a delay profile generating section for generating a delay profile from an output signal of the weight multiplying section; and a path detecting section for detecting a reception timing and arrival direction of an arriving path from the delay profile. This can reduce the direction dependence of detection accuracy during detecting a path reception timing of a desired user's radio wave.

Also, a path search circuit of the invention comprises a beam selecting section for comparing output levels of the correlation operating section, and selecting and outputting only a predetermined number of outputs of the correlating operating section, the weight multiplying section multiplying the second weight on the selected outputs of the correlation operating section by the beam selecting section. This estimates an approximate path arrival direction, eliminating the possibility to form a delay profile in a direction a path is not arriving.

Meanwhile, a path search circuit of the invention comprises: a correlation operating section for carrying out correlation operation of a plurality of base band signals obtained by demodulating a plurality of radio-frequency signals received at a plurality of antennas respectively in a plurality of radio receiving sections, with a signal predetermined for the base band signal; an orthogonal multi-beam forming section for multiplying a third weight concerning a plurality of directivities mutually orthogonal to an output of the correlation operating section; a weight multiplying section for multiplying a fourth weight on an output of the orthogonal multi-beam forming section; a delay profile generating section for generating a delay profile from an output signal of the weight multiplying section; and a path detecting section for detecting a reception timing and arrival direction of an arriving path from the delay profile. This can reduce the direction dependence of detection accuracy during detecting a path reception timing of a desired user's radio wave.

Also, a path search circuit of the invention comprises a beam selecting section for comparing output levels of the orthogonal multi-beam forming section, and selecting and outputting a predetermined number of outputs of the orthogonal multi-beam forming section, the weight multiplying section multiplying the fourth weight on the outputs of the orthogonal multi-beam forming section the beam selecting section has selected. This estimates an approximate path arrival direction, eliminating the possibility to form a delay profile in a direction a path is not arriving.

Also, in a path search circuit of the invention, the second or fourth weight is a weight for forming directivities different in main beam direction, comprising a delay profile power combining section for power-combining a plurality of delay profiles generated by the delay profile generating section, the path detecting section detecting a reception timing of the arriving path from an output of the delay profile power combining section. This improves the reception timing detecting performance of arriving paths due to the delay profile a plurality of delay profiles are power-combined.

Also, in a path search circuit of the invention, the second or fourth weight is a weight for forming directivities different in main beam direction, the path detecting section selecting a maximum power value, in each reception timing, from a plurality of the delay profiles thereby detecting an arrival direction. This makes it possible to estimate a direction from a plurality of delay profiles in each reception timing.

Also, in a path search circuit of the invention, wherein the second or fourth weight is a weight for forming directivities different in main beam direction, the path detecting section selecting a maximum power value, in each reception timing, from a plurality of the delay profiles thereby detecting an arrival direction, and detecting a reception timing of the arriving path from a delay profile generated on the basis of the maximum power value in each reception timing. This makes it possible to estimate an arriving path direction and detect a reception timing from a plurality of delay profiles.

Also, in a path search circuit of the invention, the second or fourth weight is a weight for forming directivities different in main beam direction, comprising a delay profile power combining section for power-combining a plurality of delay profiles generated in the delay profile generating section, the path detecting section detecting a reception timing of the arriving path from an output of the delay profile power combining section, and estimating an arrival direction on the basis of an output of the weight multiplying section in each reception timing of the arriving path. This makes it possible to estimate an arriving path direction and detect a reception timing from a plurality of delay profiles.

Also, in a path search circuit of the invention, the second or fourth weight is a weight for forming directivities different in main beam direction, the path detecting section detecting, from a plurality of the delay profiles, reception timings of arriving paths in the number exceeding a maximum number of paths in higher power rank for use in combining arriving path power, estimating an arrival direction on the basis of a plurality of outputs of the weight multiplying section in each arriving path reception timing, and detecting reception timings and arrival directions of arriving paths equal to or less than the maximum number of paths in a higher order of directional reception power to the arrival direction. This makes it possible, with greater accuracy, to estimate an arriving path direction and detect a reception timing from a plurality of delay profiles.

Also, in a path search circuit of the invention, the second or fourth weight is a weight for forming directivities different in main beam direction, comprising a delay profile power combining section for power-combining a plurality of delay profiles generated by the delay profile generating section, the path detecting section detecting, from outputs of the delay profile power combining section, reception timings of arriving paths in the number exceeding a maximum number of paths in higher power rank for use in combining arriving path power, estimating an arrival direction on the basis of a plurality of outputs of the orthogonal multi-beam forming section in each arriving path reception timing, and detecting reception timings and arrival directions of arriving paths equal to or less than the maximum number of paths in a higher order of directional reception power to the arrival direction. This makes it possible, with greater accuracy, to estimate an arriving path direction and detect a reception timing from a plurality of delay profiles.

Also, in a path search circuit of the invention, there are comprised an angle-spread calculating section for calculating an angle spread in arrival direction of the arriving paths detected by the bath detecting section, and an angle spread determining section for taking an average value in arrival direction of the arriving paths as an arrival direction of all the paths when the angle spread is smaller than a predetermined value. This makes it possible to suitably switch arriving-path direction estimation and reception timing detection, depending upon an angle spread.

Also, the first or third weight in the path search circuit of the invention is multiplied with a correction coefficient for correcting amplitude phase variation between the plurality of radio receiving sections. This can keep a nearly ideal beam form. Due to this, it is possible to prevent against the deterioration of path detection accuracy in a path search circuit.

Also, the first or third weight in the path search circuit of the invention is multiplied with a correction coefficient for correcting coupling between antenna elements structuring the antenna. This can keep a nearly ideal beam form. Due to this, it is possible to prevent against the deterioration of path detection accuracy in a path search circuit.

Also, the delay profile in a path search circuit of the invention is an average of delay profiles generated in a predetermined number of times by the delay profile generating section. This, although inferior in trackability to path change, can reduce noise affection, enabling path search operation with greater stability.

A radio receiver of the invention comprises: an antenna signal input section for inputting a signal from a plurality of antennas; a plurality of radio receiving sections for demodulating a radio frequency signal inputted to the antenna input section into a base band signal; an orthogonal multi-beam forming section for multiplying the base band signal by a first weight concerned with a plurality of mutually orthogonal directivities; a correlation operating section for correlation-operating outputs of the orthogonal multi-beam forming section with a predetermined signal; a weight multiplying section for multiplying an output of the correlation operating section by a second weight; a delay profile generating section for generating a delay profile from an output signal of the weight multiplying section; a path detecting section for detecting a reception timing and arrival direction of an arriving path from the delay profile; a path separating section for separating a path from the base band signal in a reception timing of arriving path detected by the path detecting section; a path reception beam generating section for forming a directional beam in an arrival direction of the arriving path for each path separated by the path separating section; and a path combining section for combining and receiving output signals of the path reception beam generating section. Due to this, as a result of path search, depending upon the information of detected path timing and path direction, a path can be separated and received with a directivity directed toward a path direction. This can reduce interference wave, enabling communications with high quality.

Meanwhile, a radio receiver of the invention comprises: an antenna signal input section for inputting a signal from a plurality of antennas; a plurality of radio receiving sections for demodulating a radio frequency signal inputted to the antenna input section into a base band signal; a correlation operating section for correlation-operating the base band signal with a predetermined signal; an orthogonal multi-beam forming section for multiplying a third weight concerned with a plurality of mutually orthogonal directivities on an output of the correlation operating section; a weight multiplying section for multiplying an output of the orthogonal multi-beam forming section by a fourth weight; a delay profile generating section for generating a delay profile from an output signal of the weight multiplying section; a path detecting section for detecting a reception timing and arrival direction of an arriving path from the delay profile; a path separating section for separating a path from the base band signal in a reception timing of arriving path detected by the path detecting section; a path reception beam generating section for forming a directional beam in an arrival direction of the arriving path for each path separated by the path separating section; and a path combining section for combining and receiving output signals of the path reception beam generating section.

Also, in a radio receiver of the invention, the path reception beam generating section forms a directional beam in a path arrival direction providing a maximum SNR from the delay profile.

Also, in a radio receiver of the invention, the path reception beam generating section forms a directional beam in a path arrival direction providing a maximum reception power from the delay profile.

Meanwhile, a radio transmitter comprises: an antenna signal input section for inputting a signal from a plurality of antennas; a plurality of radio receiving sections for demodulating a radio frequency signal inputted to the antenna input section into a base band signal; an orthogonal multi-beam forming section for multiplying the base band signal by a first weight concerned with a plurality of mutually orthogonal directivities; a correlation operating section for correlation-operating outputs of the orthogonal multi-beam forming section with a predetermined signal; a weight multiplying section for multiplying a second weight on an output of the correlation operating section; a delay profile generating section for generating a delay profile from an output signal of the weight multiplying section; a path detecting section for detecting a reception timing and arrival direction of an arriving path from the delay profile; a directional beam transmitting section for forming and transmitting a directional beam in an arrival direction of an arriving path detected by the path detecting section.

Meanwhile, a radio transmitter of the invention comprises: an antenna signal input section for inputting a signal from a plurality of antennas; a plurality of radio receiving sections for demodulating a radio frequency signal inputted to the antenna input section into a base band signal; a correlation operating section for correlation-operating the base band signal with a predetermined signal; an orthogonal multi-beam forming section for multiplying a third weight concerned with a plurality of mutually orthogonal directivities on an output of the correlation operating section; a weight multiplying section for multiplying an output of the orthogonal multi-beam forming section by a fourth weight; a delay profile generating section for generating a delay profile from an output signal of the weight multiplying section; a path detecting section for detecting a reception timing and arrival direction of an arriving path from the delay profile; and a directional beam transmitting section for forming and transmitting a directional beam in an arrival direction of an arriving path detected by the path detecting section.

Due to these, depending upon the information of path timing and path direction as a result of path search, a path can be separated and transmitted with a directivity directed toward a path direction. This can reduce interference wave, enabling communications with quality.

Also, in a radio transmitter of the invention, the directional beam transmitting section forms and transmits a directional beam in a path direction of a maximum reception power of the arriving paths. Due to these, depending upon the information of path timing and path direction as a result of path search, a path can be transmitted with a directivity directed toward a maximum reception power path direction. This can reduce interference wave, enabling communications with quality.

Also, in a radio transmitter of the invention, the directional beam transmitting section forms and transmits a directional beam in path directions of a predetermined number in higher rank of reception power of among the arriving paths. Due to this, depending upon the information of path timing and path direction as a result of path search, transmission is possible with a directivity directed toward a path direction of reception power higher rank.

Also, in a radio transmitter of the invention, the directional beam transmitting section forms and transmits a directional beam in an average arriving path direction of the arriving paths. Depending upon the information of path timing and path direction as a result of path search, transmission is possible by a directivity directed toward an average arriving path direction.

DESCRIPTION OF THE PREFERRED EMBODIMENTS

Hereunder, embodiments of the present invention will be explained by using the drawings.

Embodiment 1

Figure 1:
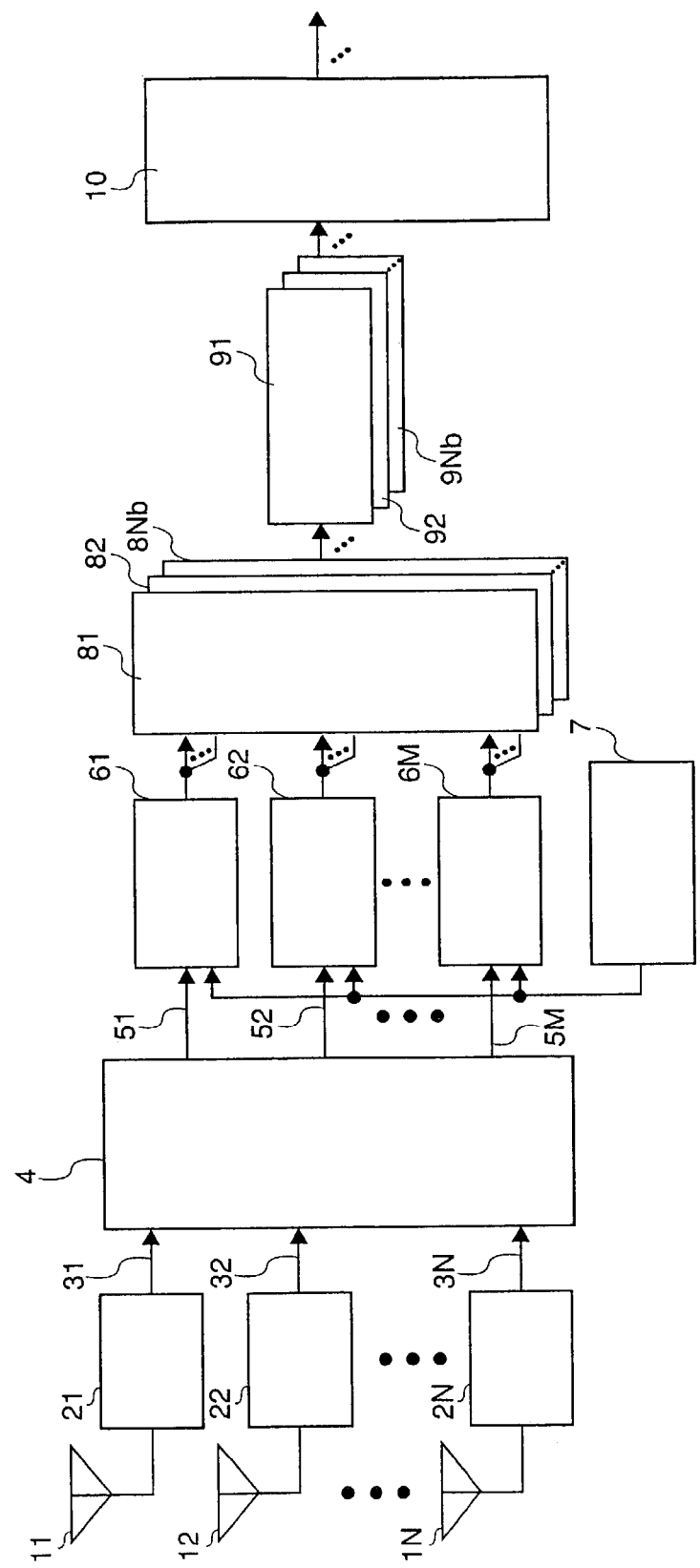
FIG. 1 is a block diagram showing a configuration of a path search circuit in embodiment 1 of the present invention.

FIG. 1 is a block diagram showing a configuration of a path search circuit according to embodiment 1 of the invention. The path search circuit shown in FIG. 1 has antennas 11–1N for receiving radio-frequency signals, radio receiving sections 21–2N for carrying out radio-frequency amplification, frequency conversion, orthogonal detection and A/D conversion, in the order, on the radio-frequency signal received at the antennas 11–1N and generating base band signals 31–3N, an orthogonal multi-beam forming section 4 for multiplying a complex coefficient on the base band signals 31–3N obtained in the radio receiving sections 21–2N to thereby multiplying for a plurality (M in the number) of beam weights orthogonal one to another, a pilot-signal generating section 7 for generating a known signal (hereinafter, pilot signal) previously embedded in the reception signal, correlation operating sections 61–6M for correlation-operating the output of the orthogonal multi-beam forming section 4 with the pilot signal, weight multiplying sections 81–8N for multiplying the outputs of the correlation operating sections 61–6M respectively by different weight vectors, delay-profile generating sections 91–9N for generating delay profiles on the basis of the output signals respectively obtained in the weight multiplying sections 81–8N, and a path detecting section 10 for outputting a timing and arrival-direction information of a path selected out of the delay profiles in the directions obtained from the delay profile generating sections 91–9N.

Figure 2:
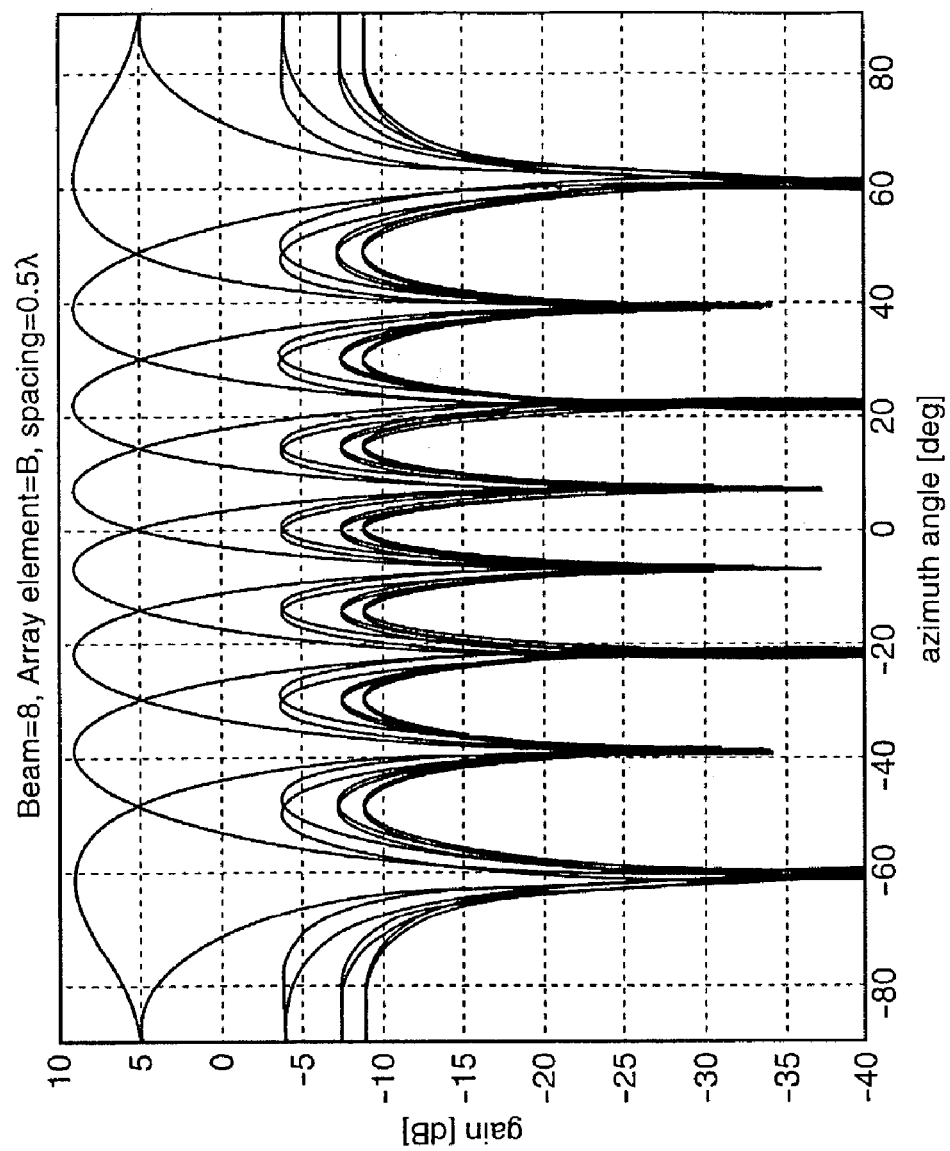
FIG. 2 is a characteristic diagram showing a directivity of an orthogonal multi-beam in embodiment 1 of the invention.
Figure 3:
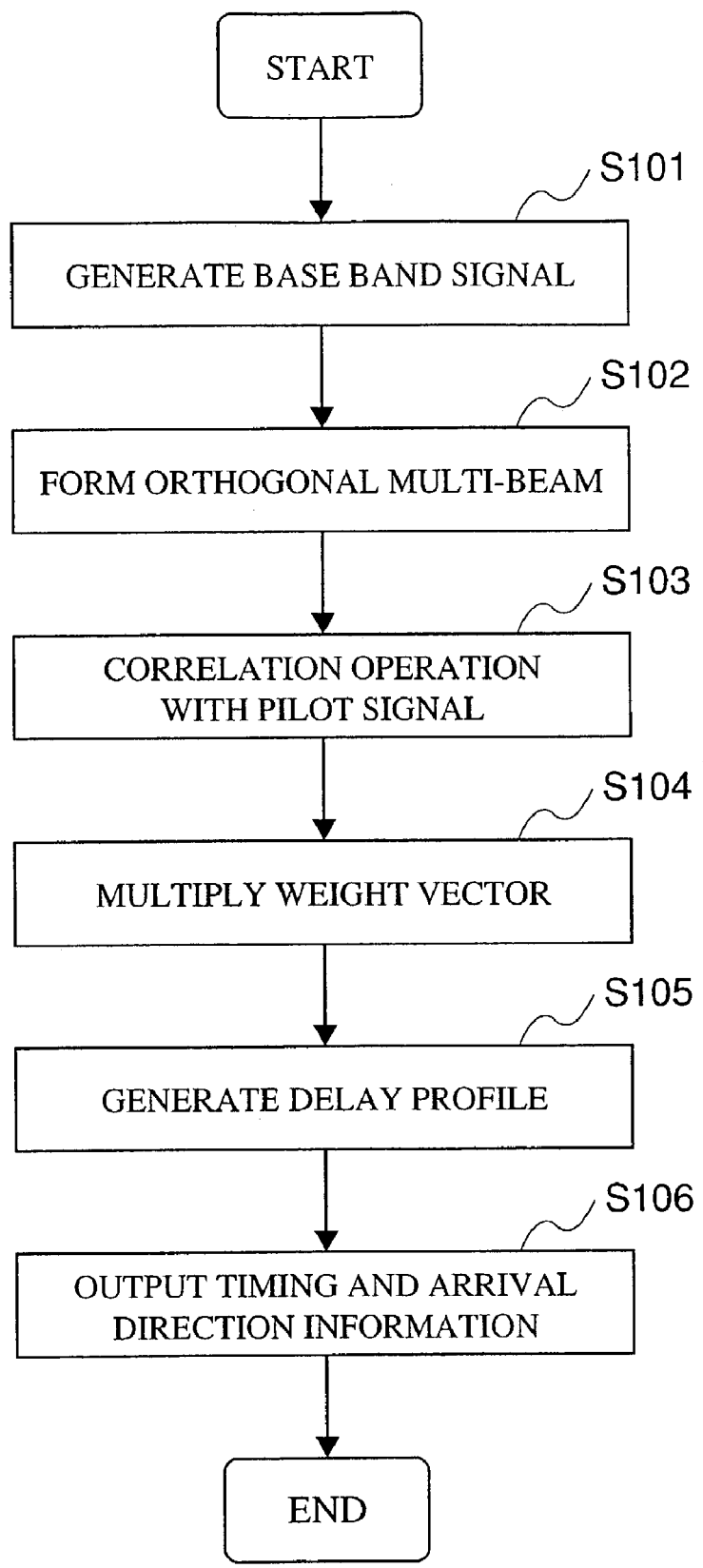
FIG. 3 is a flowchart showing an operation of the path search circuit in embodiment 1 of the invention.

Next, explanation is made in detail on the operation of the path search circuit in embodiment 1 of the invention, by using FIGS. 2 and 3. FIG. 2 shows a quarature beam pattern upon 8-element linear array at an antenna element interval of 0.5 wavelength (N=8, M=8) in embodiment 1 of the invention. FIG. 3 is a flowchart showing an operation of the path search circuit in embodiment 1 of the invention.

First, the radio receiving sections 21–2N carries out radio-frequency amplification, frequency conversion, orthogonal detection and A/D conversion, in the order, on the radio-frequency signals received at the antenna 11–1N thereby generating base band signals 31–3N (step S101). The orthogonal multi-beam forming section 4 multiplies a complex coefficient on the base band signals 31–3N obtained by the radio receiving sections 21–2N to thereby multiply a plurality (M) of beam weights orthogonal one to another, thus forming an orthogonal multi-beam (step S102).

There is, as one example of the orthogonal multi-beam, an FFT (fast Fourier transformation) beam. The beam weight Wnm, in this case, is to be expressed by (Equation 1). Herein, m is a beam number (m=1-to-M), n is the number of the base band signal 3n (n=1-to-N), M is the number of beams to be generated, and N is the number of antenna elements. Herein, M is allowed to take a value of 2 or greater but N or smaller.

$$W_{mn} = \exp\left[j2\pi\frac{(m-1)(n-1)}{M} + j\pi\frac{(n-1)}{N}\right] \quad (1)$$

The direction of the orthogonal beam pattern is toward the null of another beam, with respect to a main beam direction of each beam. Also, provided that Wmn is an element on m-th row and n-th column of a matrix W having M rows and N columns, this matrix W has a nature shown by (Equation 2). Herein, H represents a complex conjugate transposition while I represents a k-degree unit matrix. Hereinafter, W is referred to as an orthogonal beam generating matrix.

$$W^H W = I(N), \; WW^H = I(M) \quad (2)$$

Herein, in case that an n-th base band signal 3-n at a sampling time kT is expressed Xn(k), it is possible to express, by (Equation 3), a multi-beam signal 5-m received in an m-th beam that is an output of the orthogonal multi-beam forming section 4. Herein, T represents a sampling interval and * a complex conjugate (same in the subsequent) (where n=1-to-N).

$$B_m(k) = \sum_{n=1}^{N} W_{mn}^* x_n(k) \quad (3)$$

The correlation operating sections 61–6M are respectively inputted by multi-beam signals 51–5M. The pilot-signal generating section 7 generates a known signal (hereinafter, pilot signal) previously embedded in the reception signal. The correlation operating sections 61–6M carry out correlating operations with the pilot signal (step S103). For example, in the case of the CDMA communication scheme, the correlation operating sections 61–6M, after reverse scramble processing using a scrambling code and scramble code, carry out correlating operations with the pilot signal. Meanwhile, in the case of the TDMA communication scheme, the correlation operating sections 61–6M carry out correlating operations of the multi-beam signal with the pilot signal.

Herein, the pilot signal is assumably r(s). Herein, s=1-to-Np, where Np is the number of symbols on the pilot signal. The m-th correlation operating section 6M carries out the correlating operation shown in (Equation 4) on a multi-beam signal 5M, by the number of times corresponding to the number of samples Ts within a time range for path search, while changing a sample time P for staring the correlating operation. Herein, p=1-to-Ts and No is the number of over-samples with respect to the symbols.

$$h_m(p) = \sum_{s=1}^{Np} B_m(p - No \cdot (s-1))r^*(s) \quad (4)$$

Next, the weight multiplying sections 81–81N use the correlation operating sections 61–6M as inputs to carry out multiplication for weight vectors different one from another (step S104). Herein, in case that the correlation operating value having, as a start point for correlating operation, a sample time p obtained in the correlation operating section 61–6M is expressed by a correlation operating value vector $h(p)=[h1(p)h2(p) \ldots hm(p)]^T$, then a k-th weight multiplying section 8K multiplies a weight vector $u(\theta k)$ of complex coefficient by a correlation operating value vector, as shown in (Equation 5). Incidentally, k=1-to-Nb and T represents a vector transposition.

$$y(p, \theta_k) = u^H(\theta_k) h(p) \qquad (5)$$

Herein, the weight vector $u(\theta)$, provided that a directional beam weight vector $a(\theta)$ the main beam directs in a $\theta$-direction on an array antenna having N elements, can be obtained as in (Equation 6) by the use of an orthogonal beam generating matrix W.

$$u(\theta) = W a(\theta) \qquad (6)$$

The directional beam weight vector $a(\theta)$, the main beam directs toward a $\theta$-direction on an array antenna having N elements, can be expressed as (Equation 7), for example. Herein, $\lambda$ is a carrier wavelength and d is an element interval.

$$a(\theta) = \begin{bmatrix} 1 \\ \exp\{j2\pi d \cdot 1 \cdot \sin\theta/\lambda\} \\ \vdots \\ \exp\{j2\pi d \cdot (N-1) \cdot \sin\theta/\lambda\} \end{bmatrix} \qquad (7)$$

The delay profile generating sections 91–9N respectively generate delay profiles on the basis of y (p, $\theta$k) obtained in the weight multiplying sections 81–8Nb (step S105). Herein, p=1-to-Ts and k=1-to-Nb. The delay profile, by taking an absolute value or square of y (p, $\theta$k) of p=1-to-Ts, is determined to a value proportional to a path power in each timing. Because the k-th delay profile generating section 9k is equivalent to the delay profile obtained in the weight a($\theta$k) where the main beam is directed in the $\theta$k direction due to the nature of (Equation 2), each $\theta$k range is determined within an angular range over which the radio base station apparatus is to cover. Also, the angular interval can be defined from an arrival angle resolution of a path required. Because the path resolution increases with increase in the number of array elements, the angular interval of each $\theta$k is narrowed to enable more accurate path search.

The path detecting section 10 selects higher power rank paths, the maximum number of fingers for use, for example, in Rake combining is a predetermined number L, from the delay profiles in the $\theta$k direction obtained from the delay profile generating sections 91–9N, to output a timing and arrival direction information of the selected paths (step S106).

In another operation of the path detecting section 10, the path detecting section 10 considers a predetermined number of higher power rank paths as signals for each $\theta$k-direction delay profile and the others than those as noise, thereby calculating a signal-to-interference ratio (SIR). The path calculating section 10, after calculating SIR in all the directions, takes a direction providing a maximum SIR as an arriving path direction, and outputs a predetermined number L of higher power rank path timings in that direction as arriving path timing information.

In another operation of the path detecting section 10, the path detecting section 10 considers a predetermined number L of higher power rank paths as a signal for each $\theta$k-direction delay profile, and calculates a reception-signal total power over those paths. The path detecting section 10, after calculating the reception-signal total power in all the directions, takes a direction a maximum reception signal total power is obtainable as an arriving path direction, and outputs a predetermined number L of higher power rank path timings in that direction as arriving path timing information.

In another operation of the path detecting section 10, the path detecting section 10 uses as shown in (Equation 8) a power delay profile z(p) the path detecting section 10 has power-combined the delay profiles in the number of Nb to select a predetermined number L of higher power rank paths, thereby determining a path timing ps. Thereafter, as shown in (Equation 9), by determining a maximum path direction D (ps), the reception power value $|y(ps, \theta k)|^2$ assumes the maximum, from the delay profiles in the number of Nb in the selected path timing ps, a path timing ps and arrival direction information D (ps) of arriving path is outputted. Herein, p=1-to-Ts, s=1-to-L and k=1-to-Nb.

Incidentally, shown herein was the example that all the delay profiles in the number of Nb were power-combined. However, in the case of using the delay profiles in the number for obtaining a sufficient arrival angle resolution (e.g. in the case that the interval of $\theta$k is 1 degree), the following method may be used. The path detecting section 10, in the first stage, carries out power combining by the use of part of delay profiles (e.g. using those having a $\theta$k interval of approximately 10 degrees) and selects a predetermined number L of higher power rank paths, thereby determining a path timing ps. The path detecting section 10, in the second stage, may use a method of detecting a maximum path direction D (ps) only in the determined path timing ps. In this case, when estimating an direction in the second stage, it is unnecessary to calculate y (p, $\theta$k) of other than the selected path timing ps. Consequently, the path detecting section 10 is allowed to greatly reduce the amount of operation with suppression against the deterioration in path-search performance.

$$z(p) = \sum_{k=1}^{Nb} |y(p, \theta_k)|^2 \qquad (8)$$

$$D(p_s) = \left\{ \theta_k \;\middle|\; \max_{1 \le k \le Nb} |y(p_s, \theta_k)|^2 \right\} \qquad (9)$$

Meanwhile, similarly, in the case of using delay profiles in the number for obtaining a sufficient arrival angle resolution (e.g. in the case the interval of $\theta$k is 1 degree), the following method may be used. The path detecting section 10, in the first stage, carries out power combining by the use of part of delay profiles (e.g. using those having an interval of $\theta$k of approximately 10 degrees) and selects higher power rank paths in the number of Q exceeding the predetermined number L, thereby determining a path timing ps. Herein, s=1-to-Q. The path detecting section 10, in the second stage, may use a method to detect a maximum path direction D only in the determined path timing (ps) and selects again a predetermined number L of higher power rank paths by using a reception power value $|y(ps, D(ps))|^2$ in the obtained maximum path direction. In this case, although process amount somewhat increases, path search can be made by using a path reception power where arrival direction directivity is to be correctly received, thus improving the path search performance.

Figure 4:
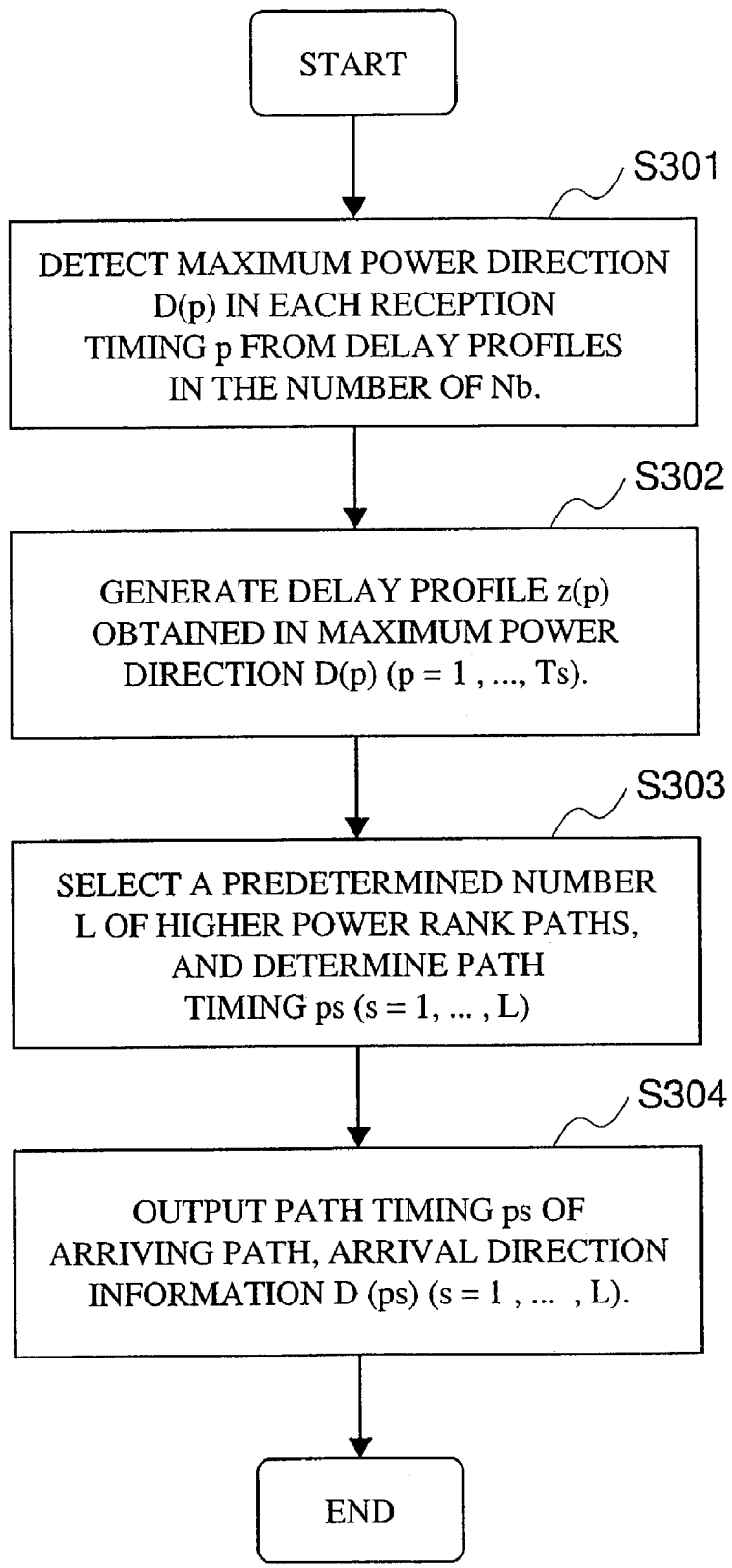
FIG. 4 is a flowchart showing an operation of a path detecting section in embodiment 1 of the invention.

Another operation of the path detecting section 10 will be next explained. FIG. 4 is a flowchart showing another operation of the operation (step S106) of the path detecting section 10 in embodiment 1 of the invention. The path detecting section 10, as shown in (Equation 10), detects a maximum power direction D(p) in each reception timing p from delay profiles in the number of Nb (step S301) and, thereafter, generates a delay profile z (p) obtainable in the maximum power direction D(p) shown in (Equation 11) (step S302), to select a predetermined number L of higher power rank paths thereby determining a path timing ps (step S303). Due to the above operation, the path detecting section 10 outputs a path timing ps and arrival direction information D (ps) of arriving path (step S304). Herein, p=1-to-Ts and S=1-to-L.

$$D(p) = \left\{ \theta_k \Big| \max_{1 \leq k \leq Nb} |y(p, \theta_k)|^2 \right\} \quad (10)$$

$$z(p) = \sum_{k=1}^{Nb} |y(p, D(p))|^2 \quad (11)$$

Figure 5:
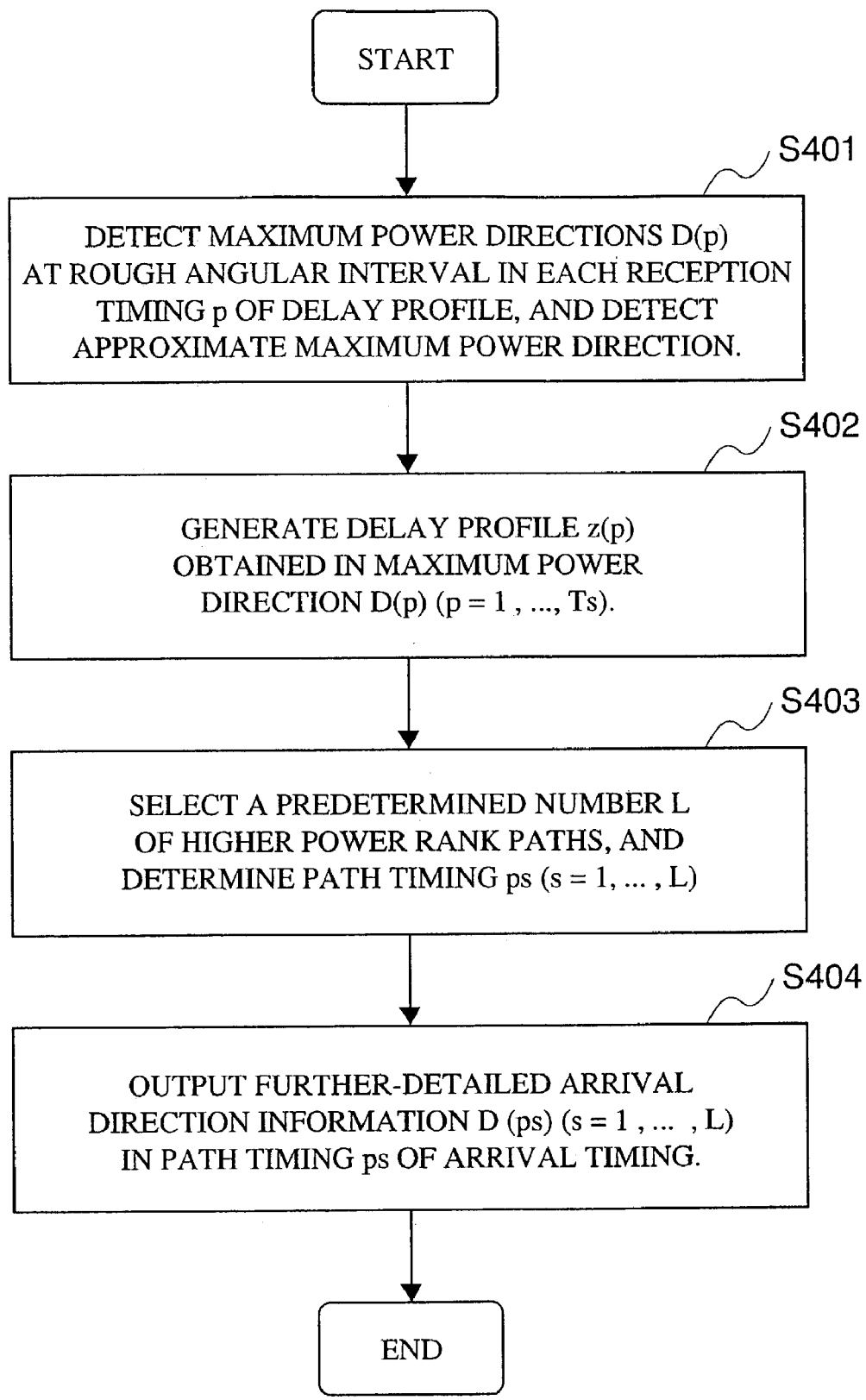
FIG. 5 is a flowchart showing an operation of the path detecting section in embodiment 1 of the invention.

Incidentally, shown herein was the example to detect a maximum power direction from all the delay profiles in the number of Nb. However, in the case of using the delay profiles in the number for obtaining a sufficient arrival angle resolution (e.g. in the case the interval of θk is 1 degree), the following method may be used. FIG. 5 is a flowchart showing another operation of the operation (step S106) of the path detecting section 10 in embodiment 1 of the invention. The path detecting section 10, in the first stage, detects a maximum power direction D (p) in each reception timing p by the use of part of delay profiles (e.g. using those the interval of θk is approximately 10 degrees) to detect an approximate maximum power direction (step S401) and, thereafter, generates a delay profile z(p) obtainable in the maximum power direction D(p) shown in (Equation 11) (step S402), to select a predetermined number L of higher power rank paths thereby determining a path timing ps (step S403). Incidentally, the step S403 may be a method of direction estimation (step S403) by increasing the accuracy in a approximate maximum power direction. In this case, when estimating a direction in the second stage, it is made unnecessary to calculate y (p, θk) of other than the selected path timing ps and periphery of the maximum power direction. Consequently, the path detecting section 10 can greatly reduce the amount of operation with suppression against the deterioration in path-search performance.

Figure 6:
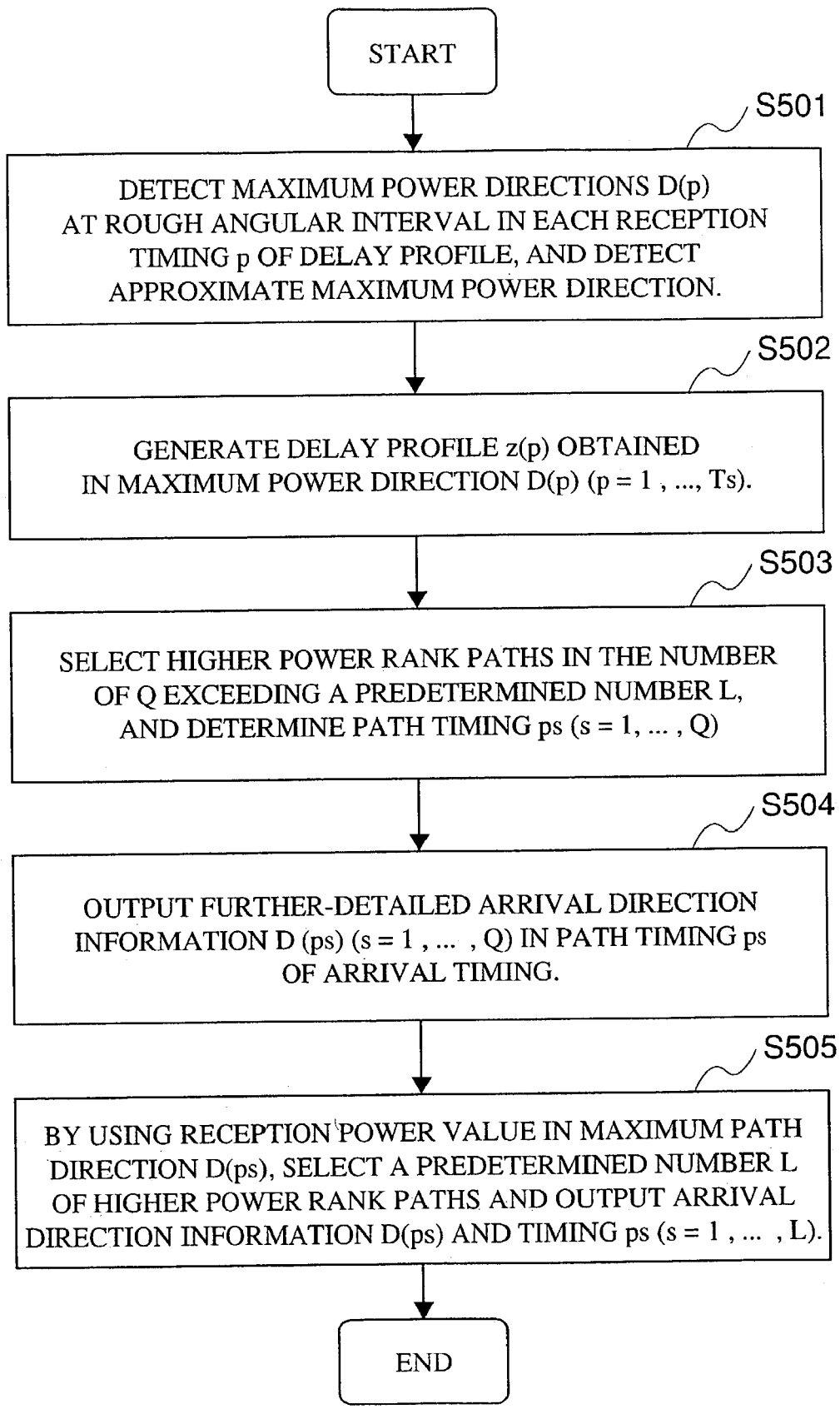
FIG. 6 is a flowchart showing an operation of the path detecting section in embodiment 1 of the invention.

Meanwhile, similarly, in the case of using the delay profiles in the number for obtaining a sufficient arrival angle resolution (e.g. in the case the interval of θk is 1 degree), the following method may be used. FIG. 6 is a flowchart showing another operation of the operation (step S106) of the path detecting section 10 in embodiment 1 of the invention. The path detecting section 10, in the first stage, detects a maximum power direction D(p) in each reception timing p by the use of part of delay profiles (e.g. those the interval of θk is approximately 10 degrees), thus detecting an approximate maximum power direction (step S501). The path detecting section 10, thereafter, generates a delay profile z(p) obtainable in the maximum power direction D(p) shown in (Equation 11) (step S502), to select higher power rank paths in the number of Q exceeding the predetermined number L thereby determining a path timing ps (step S503). Herein, S=1-to-Q. The path detecting section 10, in the second stage, may use a method to detect a maximum path direction D (ps) by increasing the accuracy of approximate maximum power directions in the number of Q (step S504) (ps) and select again a predetermined number L of higher power rank paths (step S505) by using a reception power value |y(ps, D(ps))|² in the obtained maximum path direction. In this case, although process amount somewhat increases, path search can be made with using a path reception power where receiving a correct arrival direction directivity, thus improving the path search performance.

Figure 7:
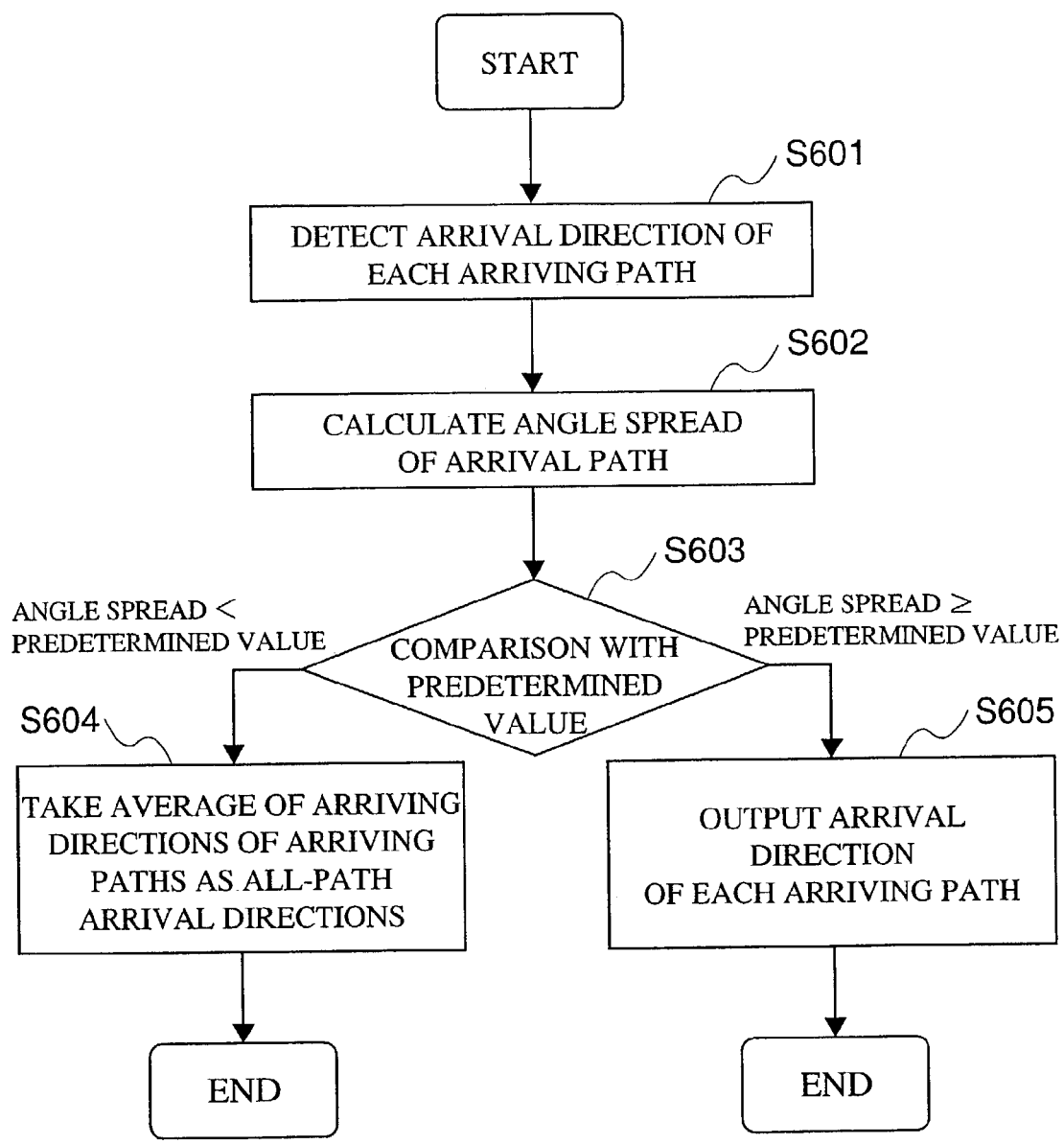
FIG. 7 is a flowchart showing an operation of the path detecting section in embodiment 1 of the invention.

Another operation of the path detecting section 10 is an operation that the foregoing path detecting section is suitably switched over. Namely, operation is switched depending upon an angle spread calculation result of calculating an angle spread in an arrival direction of each arriving path. FIG. 7 is a flowchart showing another operation of the operation (step S106) of the path detecting operation 10 in embodiment 1 of the invention. The path detecting section 10 detects an arrival direction of each arriving path (step S601) and calculates an angle spread thereof (step S602), to compare it with a predetermined value (step S603). The path detecting section 10, when the angle spread is smaller than a predetermined value, takes an average value of arrival directions of arriving paths as all path arrival direction (step S604). In the case the angle spread is equal to or greater than a predetermined value, the arrival directions of arriving paths are outputted respectively (step S605). This makes it possible to suitably switch over the arriving path direction estimation and reception timing detection depending upon an angle spread.

As described above, the present embodiment can generate a delay profile for each directivity on the basis of a correlation operating value in the correlation operating section. Furthermore, its spatial resolution can be arbitrarily set by increasing the number of weight multiplying sections present in the rear stage of the correlating operating section. This method is less in operation amount than increasing the number of directional beams in the rear stage of the radio receiving section to carry out correlating operation correspondingly to the number of beams and, thereafter, further calculating a delay profile. This does not require unnecessary increase of the scale of hardware.

Due to this, even where carrying out path search by using directional beams, it is possible to mitigate the dependence of path arrival direction and detect a direction and timing of path with accuracy regardless of from which direction a path is to arrive.

Also, in the case that the array antenna is in a regularly spaced linear array form, it is possible to use a conjugation center symmetry of a phase of a steering vector a2(θ) representative of array-antenna complex response with respect to an azimuth θ as described in (Unitary ESPRIT: How to Obtain Increased Estimation Accuracy with a Reduced Computational Burden, IEEE TRANSACTIONS ON SIGNAL PROCESSING, VOL. 43, NO. 5, MAY 1995, PP1232–1242), to apply a technique of real-numbering the steering vector by the use of a unitary matrix QN as an N-degree square matrix as shown in (Equation 12). Incidentally, a2(θ) is a steering vector where a phase center is put at an array center b(θ) is a real-numbered steering vector, which can be expressed as (Equation 14). Also, QN is expressed as shown in (Equation 13), which satisfies the nature of (Equation 2). Accordingly, by using QN as an orthogonal beam generating matrix W in the orthogonal multi-beam forming section 4 and b(θ) as a weight vector u(θ) in the weight multiplying sections 81–8N, the multiplication process in the weight multiplying sections can be changed from complex multiplication to real-number multiplication, thus making it possible to reduce the process amount by nearly a half. Herein, d is an antenna element spacing and λ is a carrier frequency wavelength.

$$b(\theta) = Q_N^H a_2(\theta) \tag{12}$$

$$Q_{2K} = \frac{1}{\sqrt{2}} \begin{bmatrix} I_K & jI_K \\ II_K & -jII_K \end{bmatrix} \text{ (when } N = 2K\text{),} \tag{13}$$

$$Q_{2K+1} = \frac{1}{\sqrt{2}} \begin{bmatrix} I_K & 0 & jI_K \\ 0 & \sqrt{2} & 0 \\ II_K & 0 & -jII_K \end{bmatrix} \text{ (when } N = 2K+1\text{),}$$

$$II_K = \begin{bmatrix} 0 & \cdots & 0 & 1 \\ 0 & \cdots & 1 & 0 \\ \vdots & \ddots & \vdots & \vdots \\ 1 & \cdots & 0 & 0 \end{bmatrix}$$

$$b(\theta) = \tag{14}$$
$$\sqrt{2}\left[\cos\left(\frac{N-1}{2}\mu\right), \ldots, \cos\left(\frac{\mu}{2}\right), -\sin\left(\frac{N-1}{2}\mu\right), \ldots, -\sin\left(\frac{\mu}{2}\right)\right]^T$$

(when N is even number), $$b(\theta) =$$
$$\sqrt{2}\left[\cos\left(\frac{N-1}{2}\mu\right), \frac{1}{\sqrt{2}}, \ldots, \cos\left(\frac{\mu}{2}\right), -\sin\left(\frac{N-1}{2}\mu\right), \ldots, -\sin(\mu)\right]^T$$

(when N is odd number), $$\mu = -\frac{2\pi}{\lambda} d \sin\theta$$

Meanwhile, the number of beams to be generated in the orthogonal multi-beam forming section 4 can be set to a smaller number of beams than the number of array elements. On this occasion, the number of correlation operating sections and the number of times of multiplications in the weight multiplying section can be decreased in addition to suppressing the deterioration in path search accuracy, making it possible to reduce the circuit scale.

Incidentally, the delay profile generating section may output those averaged in a predetermined number of times of generated delay profiles. In this case, although the trackability to path change is inferior, noise influence can be reduced to enable more stable path search operation.

Embodiment 2

Figure 8:
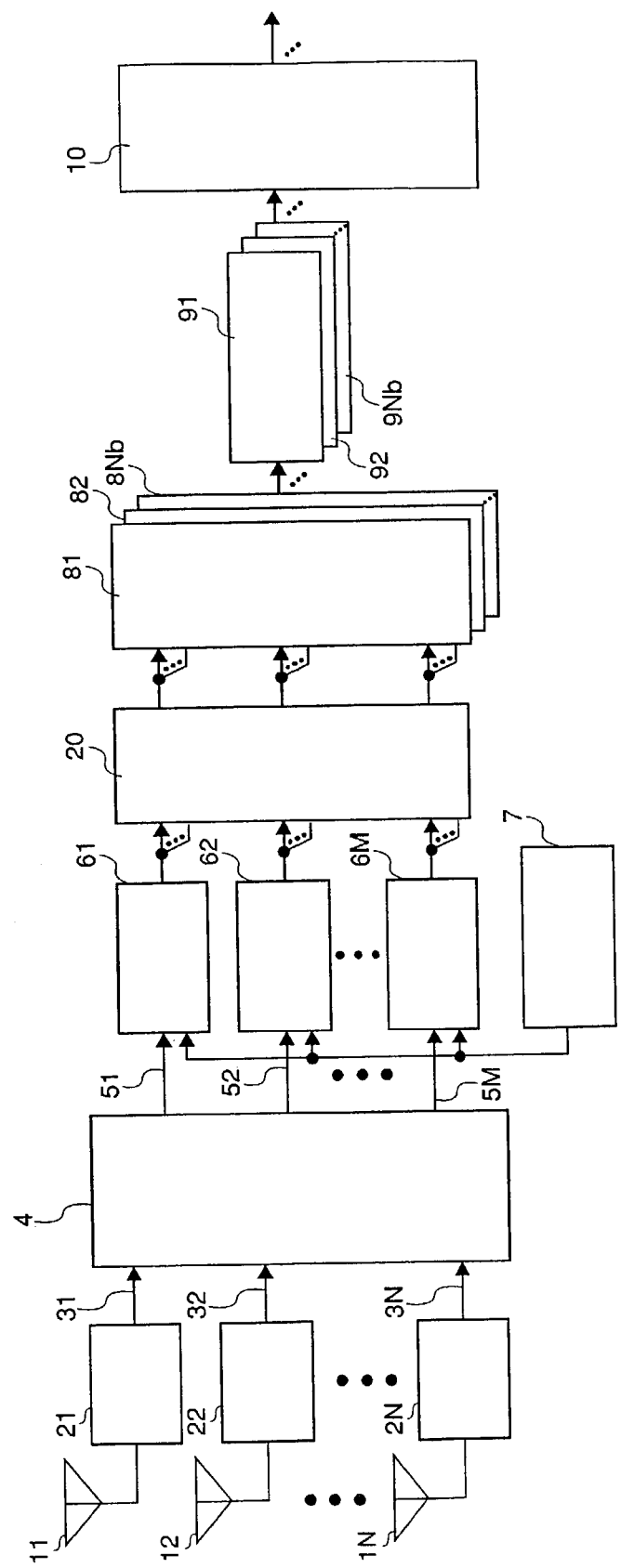
FIG. 8 is a block diagram showing a configuration of a path search circuit in embodiment 2 of the invention.

FIG. 8 is a block diagram showing a configuration of a path search circuit in embodiment 2 of the invention. The different part from embodiment 1 lies in that a beam selecting section 20 for selecting an output of the correlation operating sections 61–6M is added whereby the weight multiplying sections 81–8Nb carry out weight multiplication on the basis of an output thereof. In the below, explanation will be made mainly on the part different from embodiment 1. The radio-frequency signal received at the antennas 11–1N is subjected to radio-frequency amplification, frequency conversion, orthogonal detection and A/D conversion, in the order, in the radio receiving sections 21–2N provided on the antennas 11–1N, to form base band signals 31–3N that are to be inputted into the orthogonal multi-beam forming section 4. The orthogonal multi-beam forming section 4 multiplies a complex coefficient on the base band signal 31–3N obtained in the antenna element, thereby multiplying for a plurality (M) of beam weights orthogonal one to another.

Each of the correlation operating sections 61–6M is inputted by a multi-beam signal 51–5M. The pilot-signal generating section 7 generates a known signal (hereinafter, pilot signal) previously embedded in the reception signal. The correlation operating sections 61–6M carry out correlating operation with the pilot signal.

Herein, pilot signal is assumably r(s). Herein, s=1-to-Np, where Np is the number of symbols on the pilot signal. The m-th correlation operating section 6M carries out the correlating operation shown in (Equation 4) on a multi-beam signal 5M. At this time, the correlation operating section 6M changes the sample time p for starting a correlating operation, by the number of times corresponding to the number of samples Ts of within a time range for path search. Herein, p=1-to-Ts.

The beam selecting section 20 selects and outputs a multi-beam signal for obtaining a maximum power or maximum SIR and a multi-beam signal adjacent thereto, from the outputs of the correlation operating sections 61–6M in the number of M.

The weight multiplying sections 81–81N use an orthogonal beam partial matrix generated depending upon the selected beam in beam selection 20, to carry out weight multiplication on a selected correlation vector value. In this case, the weight multiplying section 81–8N, when a selected beam number in the beam selection 20 is Mo and the number of selecting adjacent beams is c, uses an orthogonal beam partial matrix Ws having (2×C+1) rows and N columns that (Mo+c) rows are taken out of (Mo−c) rows of an orthogonal beam partial matrix W. The k-th weight multiplying section 8K determines a weight vector us(θ) shown in (Equation 15) and carries out weight multiplication with using the us(θ) as shown in (Equation 16). Incidentally, k=1-to-Nb is assumably given.

H denotes a complex conjugate transposition. Also, in the case that θk is out of the range of selected beam direction, the configuration may be not to carry out weight multiplication. In this case, the weight multiplying sections 81–8N can be reduced in the number of times of weight multiplications, which makes it possible to reduce the circuit scale. Meanwhile, in the case that the selected beam number is c or smaller, a maximum beam number Mo=c+1 is given. Similarly, the selected beam number is greater than (Mo−c), Mo=Mo−c is given.

$$u_s(\theta) = W_s a(\theta) \tag{15}$$

$$y(p, \theta_k) = u_s^H(\theta_k) h_s(p) \tag{16}$$

Herein, hs(p) is a sub-vector that, for a correlation operating value whose start point for correlating operation is a sample time p obtained in the correlation operating sections 6-1–M, (Mo−c)-th element to (Mo+c)-th element of a correlation operating value vector h(p)=[h1(p)h2(p)...hm(p)]$^T$ are taken out.

The delay profile generating sections 91–9N, respectively, generate delay profiles on the basis of y (p, θk) obtained in the weight multiplying sections 81–8Nb. Herein, p=1-to-Ts and k=1-to-Nb. For the delay profile, by taking an absolute value or square of y (p, θk) of p=1-to-Ts, determined is a value proportional to a path power in each timing. Because, the k-th delay profile generating section 9-k is equivalent, due to the nature of (Equation 2), to the delay profile obtained in the weight a(θk) where the main beam is directed toward the θk direction, each θk range is determined within an angular range the radio base station apparatus is to cover. Also, its angular interval can be defined from the arrival angle resolution of the required path. Because the path resolution increases with increase in the number of array elements, higher accuracy of path search is made possible by narrowing each θk angular interval.

The path detecting section 10 outputs a path timing and arrival direction information by the similar operation to the explanation in embodiment 1. The explanation is omittedly made herein.

As described above, according to the present embodiment, the beam selecting section can previously detect an approximate path arrival direction from a signal obtained in the directional reception at the orthogonal multi-beam forming section 4. The weight multiplying section thereafter is allowed to detect a delay profile on a directional beam in a peripheral range of the approximate path direction, which enables path search improved in direction estimating accuracy. Also, path arrival timing is detected on the basis of the delay profile obtained by correctly directing the directional beam in a direction of arriving path. This can improve path search accuracy. It is empirically reported that, where the array antenna installation site is at a sufficiently high location, the angular spread of arriving paths lies within approximately 10 degrees. In the present embodiment, the weight multiplying section estimates an approximate path arrival direction, enabling the operation not to form a delay profile in a direction no paths are on arrival. In this case, the present embodiment is especially effectively applicable.

Also, in the present embodiment, the delay profile generating section can generate a directivity-based delay profile on the basis of a correlation operating value in the correlation operating section. Furthermore, its spatial resolution can be arbitrarily set by increasing the number of the weight multiplying section in the rear stage of the correlation operating section. This method is less in operation amount than the method that the number of directional beams in the rear stage of the radio receiving section is increased to carry out correlating operation correspondingly to the number of beams and, thereafter, delay profiles are calculated. There: is no necessity to uselessly increase the scale of hardware.

Incidentally, the delay profile generating section may output those the generated delay profiles are averaged over a predetermined number of times. In this case, although the trackability to path change is inferior, noise influence can be mitigated to enable more stable path search operation.

Embodiment 3

Figure 9:
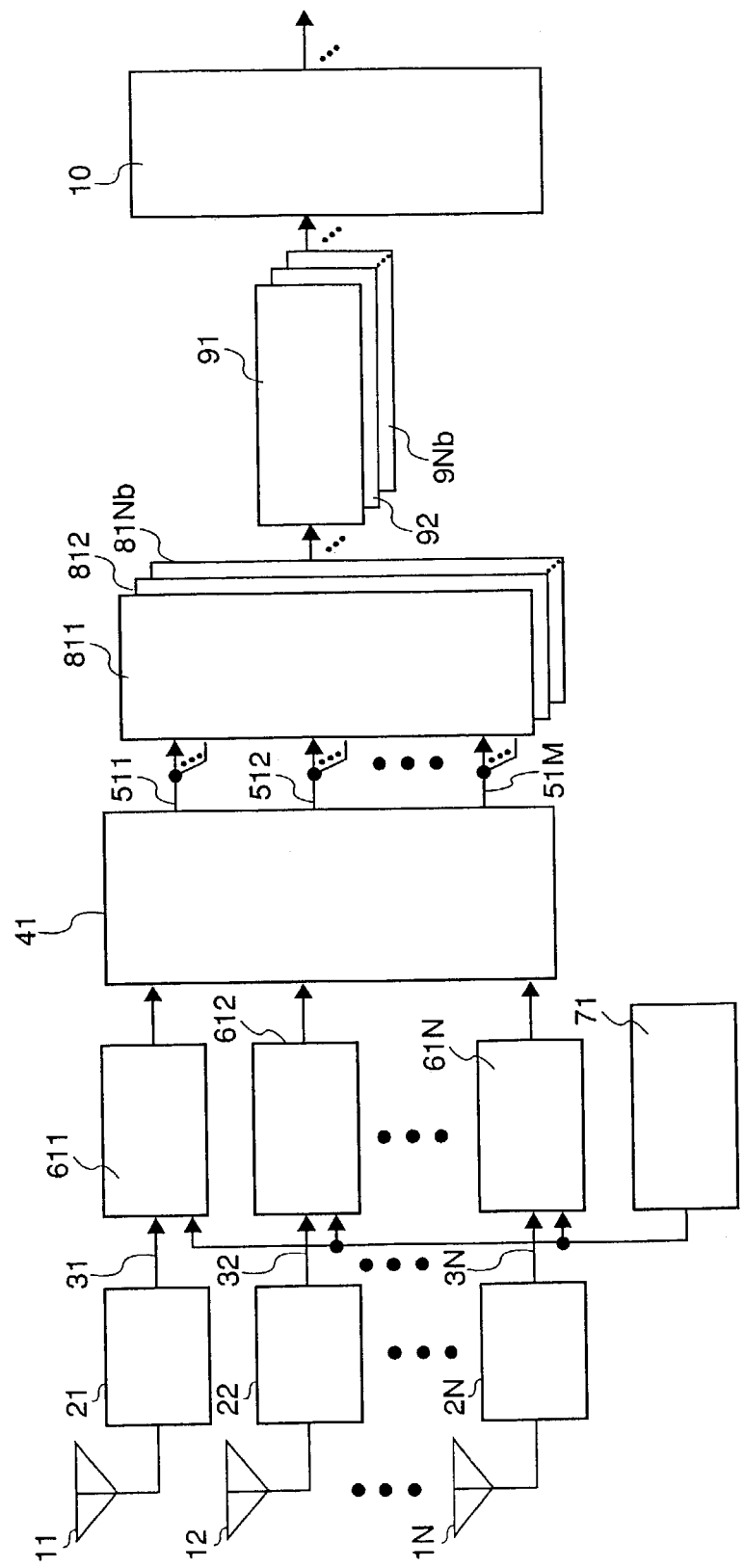
FIG. 9 is a block diagram showing a configuration of a path search circuit in embodiment 3 of the invention.
Figure 10:
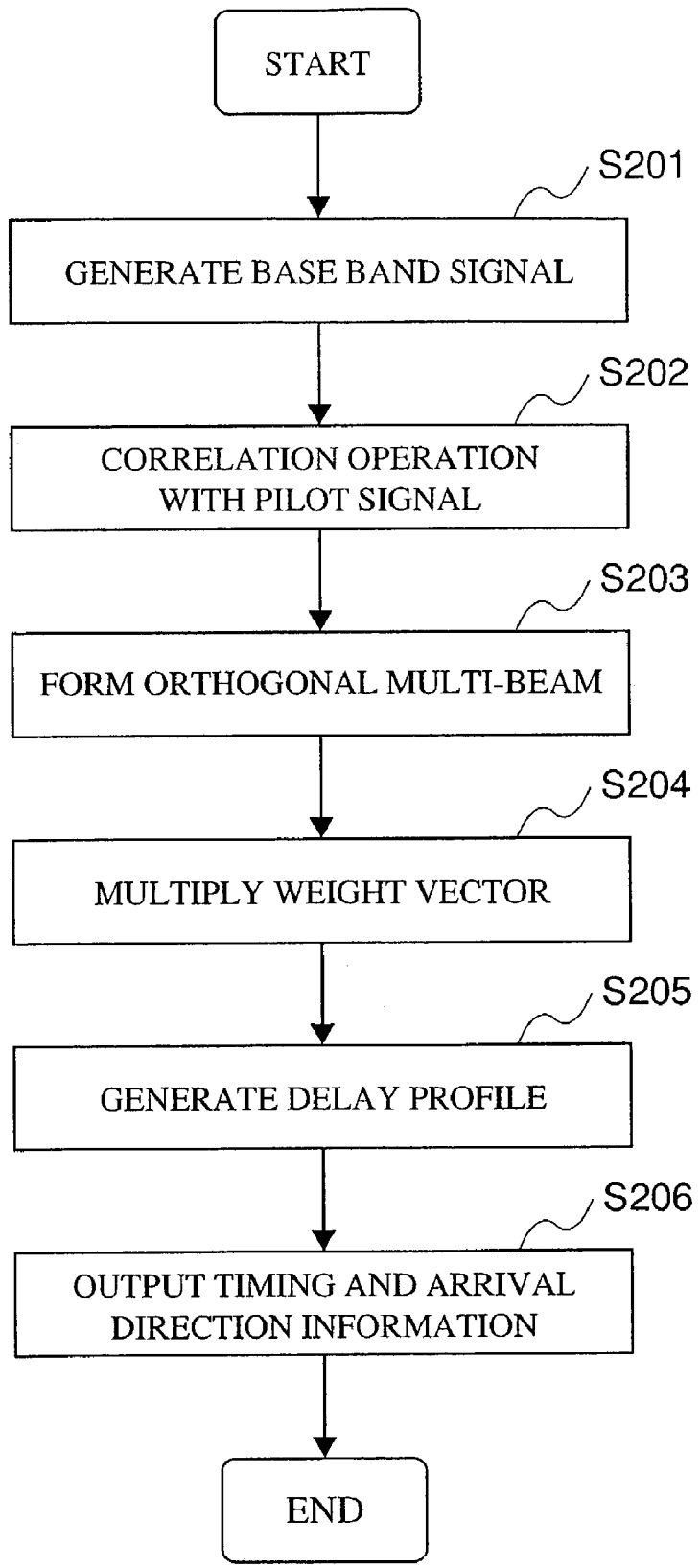
FIG. 10 is a flowchart showing an operation of the path search circuit in embodiment 3 of the invention.

FIG. 9 is a block diagram showing a configuration of a path search circuit according to embodiment 3 of the invention. The different part from embodiment 1 lies in that there are provided correlation operating sections 611–61N for carrying out correlating operation, with a pilot signal, on the base band signals as outputs of the radio receiving sections 21–2N wherein an orthogonal multi-beam forming section 41 and weight multiplying sections 811–81N are provided for the correlation operating value outputs thereof. In the below, explanation will be made mainly on the part different from embodiment 1, by using FIGS. 9 and 10. FIG. 10 is a flowchart showing the operation of the path search circuit in embodiment 3 of the invention.

In the path search circuit shown in FIG. 9, the radio-frequency signal received at the antennas 11–1N is subjected to radio-frequency amplification, frequency conversion, orthogonal detection and A/D conversion, in the order, in the radio receiving sections 21–2N provided on the antennas 11–1N. As a result, base band signals 31–3N are formed (step S201) and inputted to the correlation operating sections 611–61N in the number of N.

The correlation operating sections 611–61N are respectively inputted by base band signals 31–3N. The pilot-signal generating section 7b generates a known signal (hereinafter, pilot signal) previously embedded in the reception signal. The correlation operating sections 611–61N carry out correlating operation with the pilot signal (step S202). For example, in the case of the CDMA communication scheme, the correlation operating sections 611–61N, after descramble processing using a scrambling code and scramble code, carry out correlating operations with the pilot signal. Meanwhile, in the case of the TDMA communication scheme, the correlation operating sections 611–61N carry out correlating operations of base band signal with a pilot signal.

Herein, it is assumed that the n-th base band signal 3n in a sampling time kT is xn(k) and the pilot signal is r(s). Herein, s=1-to-Np, where Np is the number of symbols on the pilot signal. The n-th correlation operating section 61n carries out the correlating operation shown in (Equation 17) on a base band signal 3n by the number of times corresponding to the number of samples Ts of within a time range of path search, while changing the sample time p for starting correlating operation. Herein, p 1-to-Ts and No is the number of over-samples for the symbol.

$$h_n(p) = \sum_{s=1}^{N_p} x_n(p + No \cdot (s-1)) r^*(s) \qquad (17)$$

Next, the orthogonal multi-beam forming section 4b multiplies a complex coefficient on the outputs of the correlation operating sections 6b to thereby multiply for a plurality (M in the number) of beam weights orthogonal one to another, thus forming an orthogonal multi-beam (step S203).

There is, for example, an FFT (fast Fourier transformation) beam as one example of the orthogonal multi-beam, as was explained in embodiment 1. The orthogonal beam generating matrix W, in this case, can be expressed as (Equation 1).

Herein, in case the output of the n-th correlation operating section 61n in a sampling time p is expressed hn(p), then the multi-beam signal 51m received on the m-th beam as an output of the orthogonal multi-beam forming section 4b can be expressed by (Equation 18). Herein, p=1-to-Ts is shown, (where n=1-to-N).

$$B_m(p) = \sum_{n=1}^{N} W_{mn}^* h_n(p) \qquad (18)$$

Next, the weight multiplying sections 811–81N input the multi-beam signals 511–51M obtained in the orthogonal multi-beam forming section 41 thereby multiplying for weight vectors different one from another (step S204). Herein, in case the outputs at the sample time p of the multi-beam signals 511–51M are expressed by multi-beam signal vectors B(p)=[B1(p)B2(p) . . . Bm(p)]$^T$, the k-th weight multiplying section 8b-k multiplies a weight vector u(θk) of complex coefficient on a correlation operating value vector, as shown in (Equation 19). Incidentally, k=1-to-Nb and H represents a conjugate transposition.

$$y(p, \theta_k) = u^H(\theta_k) B(p) \qquad (19)$$

Herein, the weight vector u(θ), provided that directional beam weight vector a(θ) has a main beam directing in a θ direction on an array antenna having N elements, can be obtained as in (Equation 6) by using an orthogonal beam generating matrix W.

Next, the delay profile generating sections 91–9N respectively generate delay profiles on the basis of y (p, θk) obtained in the weight multiplying section 811–81N (step S205). Herein, p=1-to-Ts and k=1-to-Nb. For the delay profile, by taking an absolute value or square of y (p, θk) of p=1-to-Ts, determined is a value proportional to a path power in each timing. Because the delay profile generated by the k-th delay profile generating section 9k is equivalent, due to the nature of (Equation 2), to the delay profile obtained by a weight a(θk) where the main beam is directed in a θk direction, each θk range is defined within an angular range the radio base-station apparatus is to cover. Also, its angular interval can be defined from an arrival angle resolution of a path required. Since the path resolution increases with increase in the number of array elements, the angular interval of each θk is narrowed. Consequently, more accurate path search is made possible.

The path detecting section 10 selects higher power rank paths in a predetermined number of the maximum number of fingers for use, for example, in Rake combining from the delay profiles in each θk obtained from the delay profile generating sections 91–9N, and outputs a timing and arrival direction information of the selected path (step S206).

The path detecting section 10 outputs path timing and arriving path direction information, by the similar operation to the explanation in embodiment 1. The explanation is omittedly made herein.

As described above, according to the present embodiment, a directivity-based delay profile can be generated on the basis of a correlation operating value in the correlation operating section. Furthermore, its spatial resolution can be arbitrarily set by increasing the number of the weight multiplying sections present in the rear stage of the correlation operating section. This method is less in operation amount than the method that the number of directional beams in the rear stage of the radio receiving section is increased to carry out correlating operation correspondingly to the number of beams and, thereafter, delay profiles are calculated. There is no necessity to uselessly increase the scale of hardware.

Due to this, even where carrying out path search by using directional beams, it is possible to mitigate the dependence of path arrival direction and detect a direction and timing of path with accuracy regardless of from which direction a path is to arrive.

Also, in the case that the array antenna is in a regularly spaced linear array form, it is possible to use a conjugation center symmetry of a phase of a steering vector a2(θ) representative of array-antenna complex response with respect to an azimuth θ as explained in embodiment 1, to adapt a technique that a unitary matrix QN as an N-degree square matrix is determined as shown in (Equation 12) and real-numbering the steering vector by using the matrix QN. In this case, in the orthogonal multi-beam forming section 4b, QN shown in (Equation 13) is used as an orthogonal beam generating matrix W. Also, in the weight multiplying sections 811–81N, b(θ) shown in (Equation 14) is used as a weight vector u(θ). Due to these, the multiplication process in the weight multiplying section can be made by real-number multiplication instead of complex multiplication, obtaining an effect to reduce the amount of processing by a half.

Meanwhile, the number of the beams to be generated in the orthogonal multi-beam forming section 4 can be set to a smaller number of beams than the number of array elements. On this occasion, in addition to suppressing the deterioration in path search accuracy, it is possible to reduce the number of correlation operating sections and the number of times of multiplications in the weight multiplying section, enabling to reduce the circuit scale.

Incidentally, the delay profile generating section may output those averaged in a predetermined number of times of generated delay profiles. In this case, although the trackability to path change is inferior, noise influence can be reduced to enable path search operation with greater stability.

Embodiment 4

Figure 11:
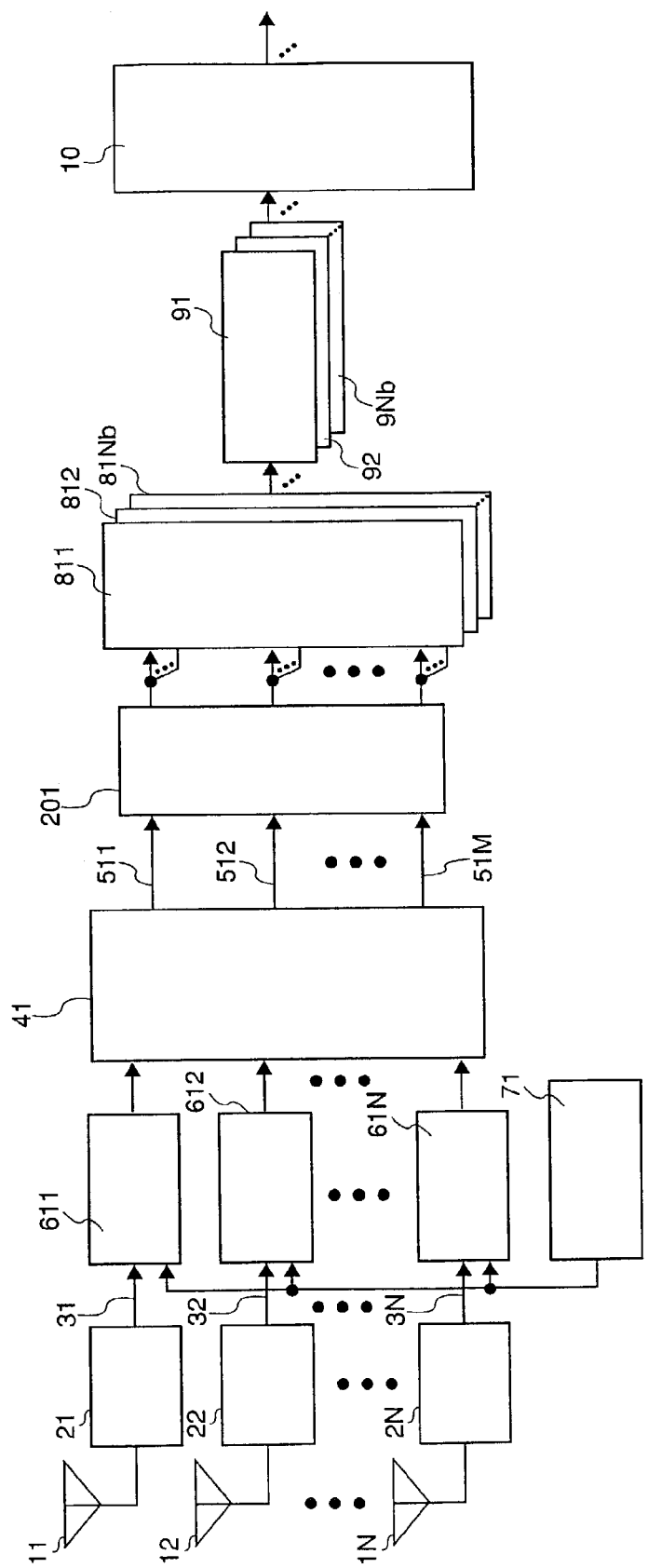
FIG. 11 is a block diagram showing a configuration of a path search circuit in embodiment 4 of the invention.

FIG. 11 is a block diagram showing a configuration of a path search circuit in embodiment 4 of the invention. The present embodiment shows another configuration of embodiment 3. The different part from embodiment 3 lies in that there is added a beam selecting section 201 for selecting outputs of the multi-beam signal phases 511–51M obtained in an orthogonal multi-beam forming part 41 wherein weight multiplication is carried out on the basis of outputs thereof in the weight multiplying sections 811–81N. In the below, explanation is made mainly on the part different from embodiment 1.

In the path search circuit shown in FIG. 11, the radio-frequency signal received at the antennas 11–1N is subjected to radio-frequency amplification, frequency conversion, orthogonal detection and A/D conversion, in the order, in the radio receiving sections 21–2N provided on the antennas 11–1N. As a result, base band signals 31–3N are formed and inputted to the correlation operating sections 611–61N in the number of N.

The correlation operating sections 611–61N are respectively inputted by base band signals 31–3N. The pilot-signal generating section 71 generates a known signal (hereinafter, pilot signal) previously embedded in the reception signal.

The correlation operating sections 611–61N carry out correlating operation with a pilot signal.

Herein, it is assumed that the n-th base band signal 3-n in a sampling time kT is xn(k) and the pilot signal is r(s). Herein, s=1-to-Np, where Np is the number of symbols on the pilot signal. The n-th correlation operating section 61n carries out the correlating operation shown in (Equation 17) on the base band signal 3n by the number of times corresponding to the number of samples Ts of within a time range of path search, while changing the sample time p for starting correlating operation.

The orthogonal multi-beam forming section 41 multiplies a complex coefficient on the outputs of the correlation operating sections 61, thereby multiplying for a plurality (M) of beam weights orthogonal one to another.

There is, for example, an FFT (fast Fourier transformation) beam known as one example of the orthogonal multi-beam, as was explained in embodiment 1. The orthogonal beam generating matrix W, in this case, can be expressed as (Equation 1).

Herein, in case the output of the n-th correlation operating section 61n in a sampling time p is expressed hn(p), then the multi-beam signal 51m received on the m-th beam as an output of the orthogonal multi-beam forming section 4b can be expressed by (Equation 18).

The beam selecting section 20 selects and outputs a multi-beam signal for obtaining a maximum power or maximum SIR and a multi-beam signal adjacent thereto, from the outputs of the correlation operating sections 61–6M in the number of M.

The weight multiplying sections 811–81N use an orthogonal beam partial matrix generated depending upon the selected beam in beam selection 201, to carry out weight multiplication on a selected correlation vector value. In this case, when a selected beam number in the beam selection 201 is Mo and the number of selecting adjacent beams is c, by using an orthogonal beam partial matrix Ws having (2×C+1) rows and N columns that (Mo+c) rows are taken out of (Mo−c) rows of an orthogonal beam partial matrix W, the k-th weight multiplying section 8k determines a weight vector us(θ) shown in (Equation 15) and carries out weight multiplication with using the us(θ) as shown in (Equation 20). Incidentally, k=1-to-Nb and H denotes a complex conjugate transposition. Also, in the case that θk is out of the range of selected beam direction, weight multiplication may not be structurally carried out. In this case, the number of times of weight multiplications can be reduced, making it possible to reduce the circuit scale. Meanwhile, in the case that the selected beam number is $\underline{c}$ or smaller, a maximum beam number Mo(=c+1) is given. Similarly, selected beam number is greater than (Mo−c), Mo=Mo−c is given.

$$y(p, \theta_k) = u_s^H(\theta_k) B_s(p) \quad (20)$$

Herein, Bs(p) is a sub-vector that (Mo−c)-th element to (Mo+c)-th element are taken in the case the output at a sample time p of the multi-beam signal 511–51M obtained in the orthogonal multi-beam forming section 41 is expressed by a multi-beam signal vector B(p)=[B1(p) B2(p) . . . Bm(p)]$^T$.

The delay profile generating sections 91–9N respectively generate delay profiles on the basis of y (p, θk) obtained in the weight multiplying sections 811–81N. Herein, p=1-to-Ts and k=1-to-Nb. For the delay profile, by taking an absolute value or square of y (p, θk) of p=1-to-Nb, determined is a value proportional to a path power in each timing. Because, the delay profile generated by the k-th delay profile generating section 9-k is equivalent, in the nature of (Equation 2), to the delay profile obtained in the weight a(θk) the main beam is directed in the θk direction, each θk range is determined within an angular range the radio base station apparatus is to cover. Also, its angular interval can be defined from an arrival angle resolution of the required path. Because the path resolution increases with increase in the number of array elements, each θk angular interval is narrowed. Consequently, higher accuracy of path search is made possible.

The path detecting section 10 outputs a path timing and arrival direction information by the similar operation to the explanation in embodiment 1. The explanation is omittedly made herein.

As described above, according to the present embodiment, the beam selecting section can previously detect an approximate path arrival direction from the signal obtained in directional reception at the orthogonal multi-beam forming section 4b. The weight multiplying section thereafter is allowed to detect a delay profile on a directional beam in a peripheral range of the approximate path direction, which enables path search improved in direction deducing accuracy. Also, by detecting a path arrival timing on the basis of the delay profile obtained by correctly directing the directional beam in a direction of arriving path, path search accuracy can be improved. It is empirically reported that, where the array antenna installation site is at a sufficiently high location, the angular spread of arriving paths lies within approximately 10 degrees. In the present embodiment, the path detecting section estimates an approximate path arrival direction, enabling the operation not to form a delay profile in a direction no paths are on arrival. In this case, the present embodiment is especially effectively applicable.

Also, in the present embodiment, a directivity-based delay profile can be generated on the basis of a correlation operating value in the correlation operating section. Furthermore, its spatial resolution can be arbitrarily set by increasing the number of the weight multiplying sections in the rear stage of the correlation operating section. This method is less in operation amount than the method that the number of directional beams in the rear stage of the radio receiving section is increased to carry out correlating operation correspondingly to the number of beams and, thereafter, delay profiles are calculated. There is no necessity to uselessly increase the scale of hardware.

Incidentally, the delay profile generating section may output those the generated delay profiles are averaged over a predetermined number of times. In this case, although the trackability to path change is inferior, noise influence can be reduced. This enables more stable path search.

Embodiment 5

Figure 12:
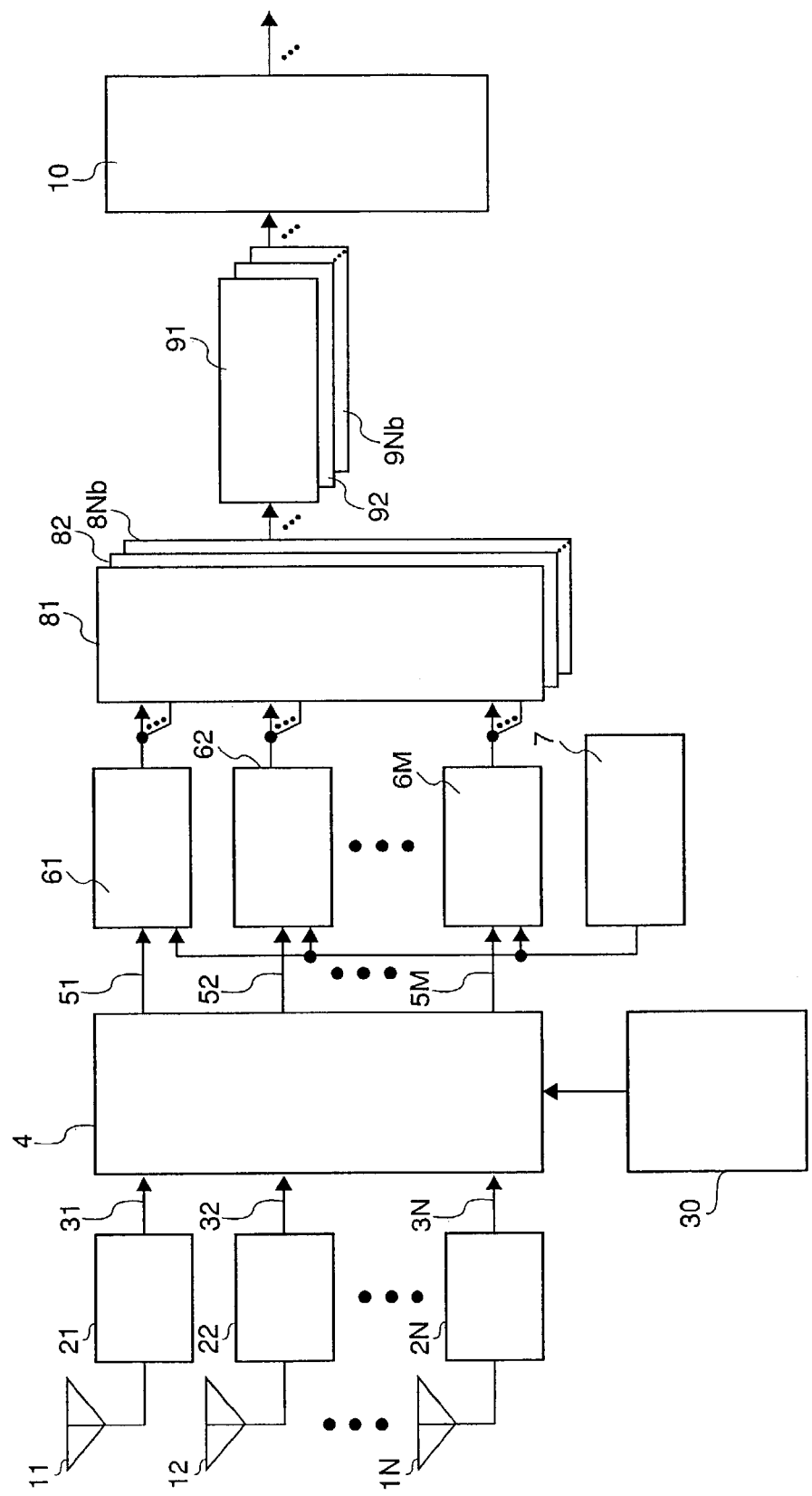
FIG. 12 is a block diagram showing a configuration of a path search circuit in embodiment 5 of the invention.

FIG. 12 is a block diagram showing another configuration of a path search circuit in embodiment 1 of the invention. The different part from embodiment 1 lies in that there is added a correction-matrix generating section 30 for correcting the coupling between the array elements and phase amplitude variation between radio receiving sections whereby a correction matrix Wc thereof is inputted to the orthogonal multi-beam forming section 4. In the below, explanation is made mainly on the part different from embodiment 1.

The radio-frequency signal received at the antennas 11–1N is subjected to radio-frequency amplification, frequency conversion, orthogonal detection and A/D conversion, in the order, in the radio receiving sections 21–2N provided on the antennas 11–1N. As a result, base band signals 31–3N are formed and inputted to the orthogonal multi-beam forming section 4.

The correction matrix generating section 30 generates a matrix for correcting the coupling between the array elements and phase amplitude variation between the radio receiving sections. The generation of an N-degree correction matrix C1 for coupling between the array elements is to be obtained by measuring the characteristic only of the array antenna part within a radio darkroom. The detail is disclosed in the document, Sensor-Array Calibration Using a Maximum-Likelihood Approach, IEEE TRANSACTIONS ON ANTENNAS AND PROPAGATION, VOL. 44, NO.6, JUNE 1996, PP827–835, and hence the detail is omittedly explained herein.

The correction method for phase amplitude variation in the radio receiving section is disclosed, for example, in JP-A-2001-86049. This is to be obtained by superposing, the calibration signal through a coupler in the front stage of the radio receiving section and periodically calculating a phase difference φk and amplitude difference Ak at k=2-to-N, on another base band signal (3-k) with respect to a reference base band signal (e.g. 3-l). The complex conjugate value these phase difference and amplitude difference are expressed in complex numeral provides a correction value. In the case of representation as an N-degree matrix C2, expression is possible by (Equation 21).

$$C_2 = \begin{bmatrix} 1 & 0 & \cdots & 0 \\ 0 & A_2\exp(-j\phi_2) & 0 & \vdots \\ 0 & 0 & \ddots & 0 \\ 0 & \cdots & 0 & A_N\exp(-j\phi_N) \end{bmatrix} \quad (21)$$

The orthogonal multi-beam forming section 4 multiplies a correction matrix Wc obtained in the correction-matrix forming section 30 on the orthogonal beam matrix W thereby making a correction and then multiplies a corrected complex coefficient on the base band and signals 31–3N obtained at the antenna elements, thereby multiplying for a plurality (M) of beam weights orthogonal one to another. In this case, the corrected orthogonal beam matrix W2 can be expressed by (Equation 22).

$$W_2 = WW_C = WC_1C_2 \quad (22)$$

The subsequent operation, because of similarity to embodiment 1, is omitted in the below.

As described above, according to the present embodiment, by adding the correction matrix generating section 30 for correcting the coupling between the array elements and phase amplitude variation between the radio receiving sections to multiply a correction matrix Wc on the orthogonal multi-beam forming section 4, it is possible to keep a nearly ideal beam form. This can prevent against the deterioration in path detection accuracy on the path search circuit, in addition to the effect of embodiment 1.

Incidentally, although the present embodiment explained with the method for simultaneously correcting the coupling between the array elements and phase amplitude variation between the radio receiving sections, the case with any one is also applicable. Namely, similar process can be applied in case any of C1 and C2 is considered as an N-degree unit matrix.

Meanwhile, although this embodiment explained the configuration the correction matrix forming section 30 was added to embodiment 1, similar effect is to be obtained in any configuration of the other embodiments 2 to 4 by multiplying the orthogonal multi-beam forming section 4 by a correction matrix Wc therefor.

Embodiment 6

Figure 13:
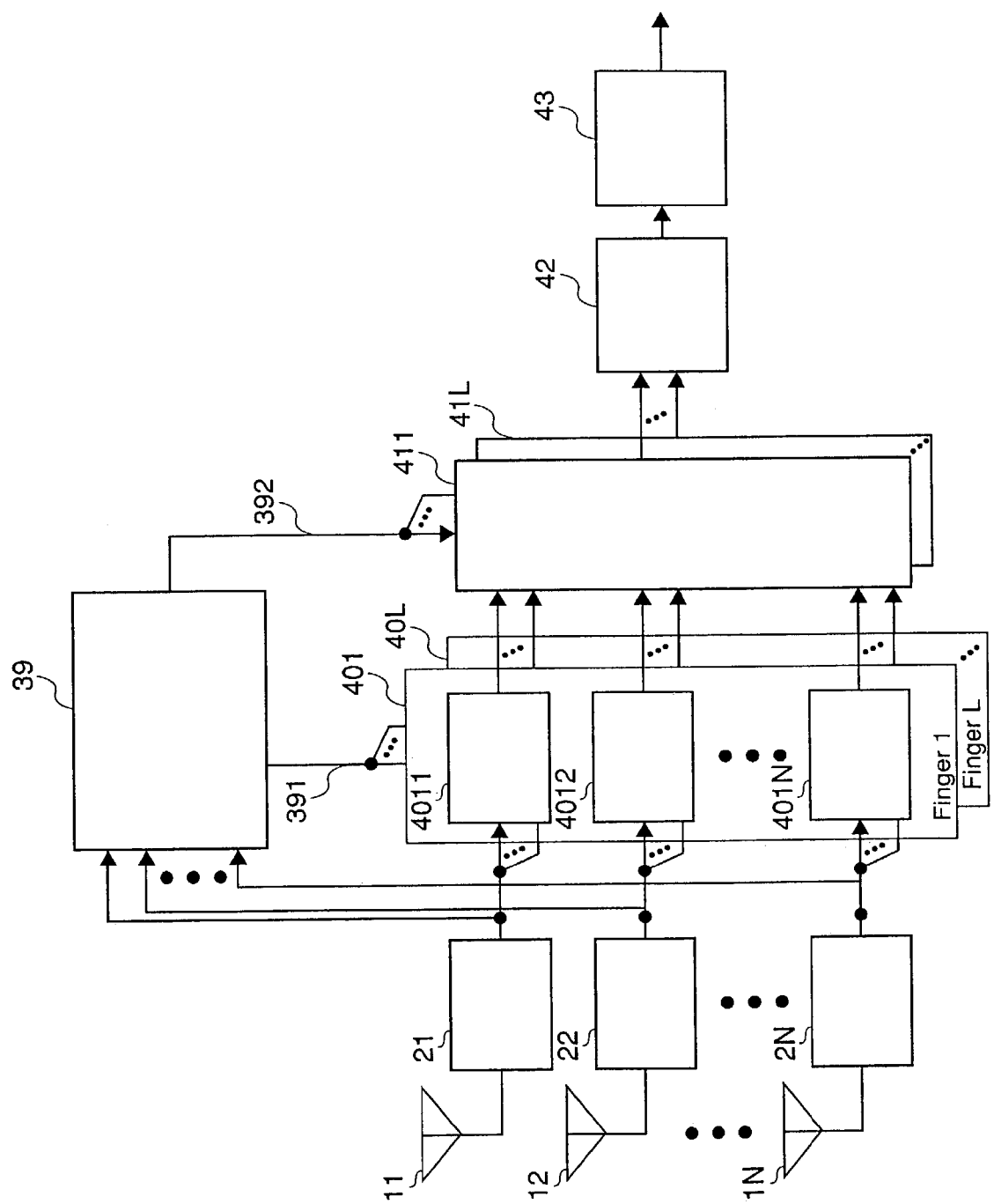
FIG. 13 is a block diagram showing a configuration of a radio receiver in embodiment 6 of the invention.
Figure 14:
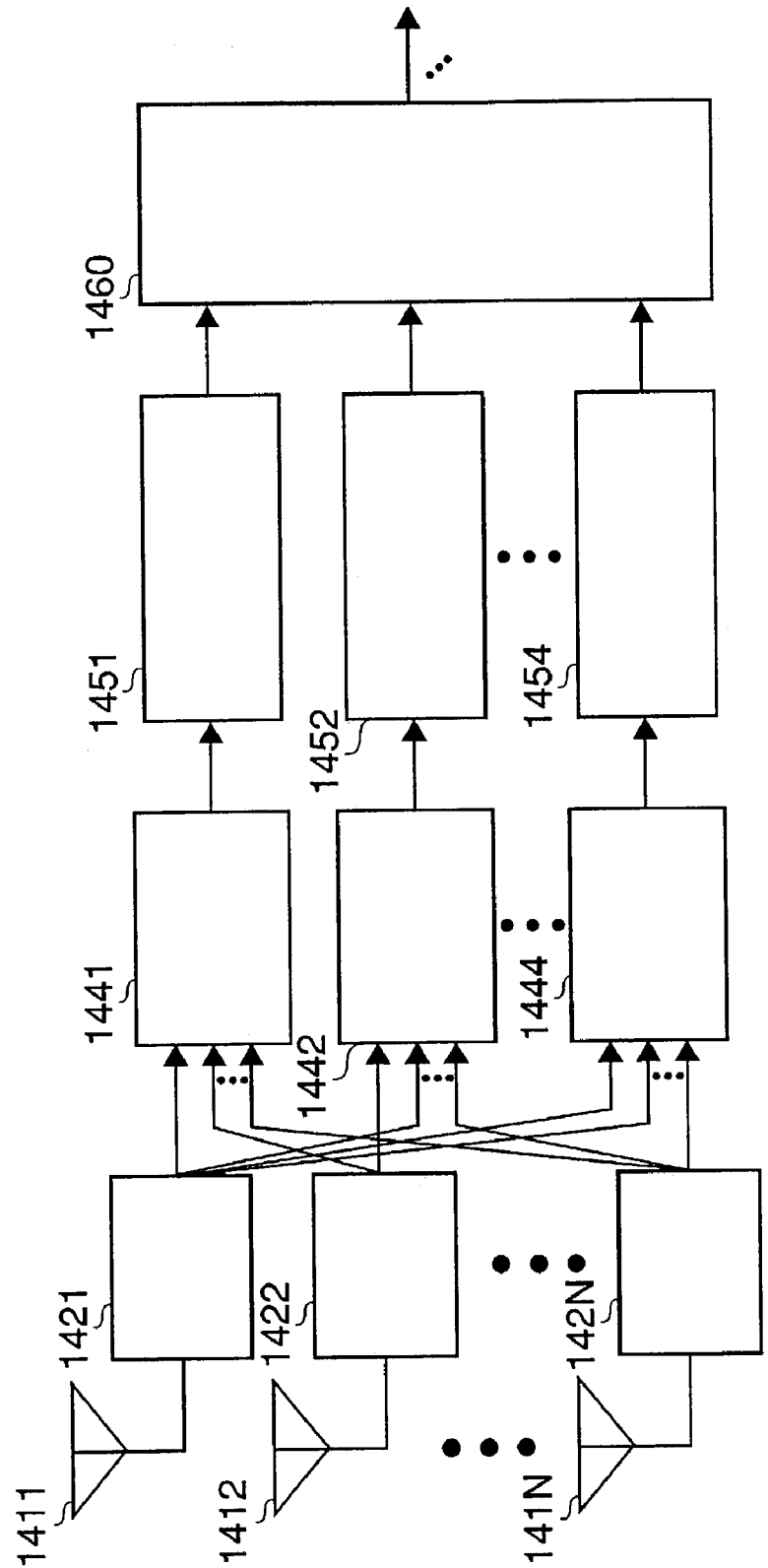
FIG. 14 is a block diagram showing a configuration of a conventional path search circuit.

FIG. 13 is a block diagram showing a configuration of a radio receiver in embodiment 6 of the invention. This radio receiver determines a path separation timing on the basis of a result of path search in the path search circuit 39 of any of embodiments 1 to 5 of the invention, and further forms a reception directional beam. Because the operation in the path search circuit 39 was already explained, explanation is made in the below mainly on the other part than the path search circuit. Incidentally, handled herein is the receiving operation on the code division multiple access (CDMA) communication scheme.

The operation of up to conversion of the radio-frequency signal by the array antenna 1 into base band signals 31–3N is similar to embodiment 1.

The de-spreading sections 401–40N carry out de-spreading process on the basis of the timing information for the multipath components in the number of L (hereinafter, first path—L-th path) detected in the path search circuit 39. Namely, the de-spreading sections $401 \geq 40L$ carry out de-spreading process in reception timing of each path arrival at the antenna 11–1N. Due to this, in the de-spreading sections 40p1–40pN for path p connected distributed in the number of paths from the antennas 11–1N, the signals on p-th path received at the antennas 11–1N are respectively taken out, where p=1-to-L.

The path reception beam-forming sections 411–41M generates a beam way vector to be directed in each path direction detected by the path search circuit from the main beam of the array antenna 1 for the multipath components in the number of L detected by the path search circuit 39, and multiply it on the outputs of the de-spreading sections $401 \geq 40L$. Namely, provided that the weight vector for the p-th path direction is Wp, the path reception beam-forming section makes multiplication on the output of the de-spreading section 40p1–40pN to output an array combining signal zp(k), where p=1-to-L. The beam weight vector Wp uses, for example, a steering vector a(θ), Chebyshev beam, maximum-ratio combining beam or the like.

The Rake combining section 42 multiplies the array combining signals z1(k)–zL(k) on first—L-th passes respectively by complex conjugate values (h1')*-(hL')* of channel estimation values h1'-hL'. After compensating the line variation values h1-hL, Rake combining is done. The Rake-combined signal is code-determined in a data determining section 43, thereby obtaining reception data.

In this manner, according to the present embodiment, on the basis of a path timing and path direction information as a result of path search by the path search circuit 39, it is possible to separate a path and receive it with a directivity toward the path direction. This can reduce interference wave, enabling quality communication.

Incidentally, in the present embodiment, the radio receiver formed a directional beam in a path direction detected for each path in a path timing detected in the path search circuit 39. However, the configuration may be to form a directional beam common to the paths in a path arrival direction of providing a maximum SNR, from a delay profile detected in the path search circuit.

Also, in the present embodiment, the path search circuit 39 was used on the radio receiver, it may use on a radio transmitter. In this case, the radio transmitter is for transmission with a directivity in a path direction obtained in the path search circuit, wherein corresponding to path-based directivity, transmission is with the directivities in a predetermined number of path directions of higher reception power rank. Otherwise, transmission may be with a directivity only in a maximum reception path power direction, in a path direction providing the maximum SNR or in an average arriving path direction of arriving paths.

Also, although the present embodiments explained on the base station apparatus for use in a communication system using a CDMA scheme as a multiplex scheme, this is not limitative. The present invention is applicable also to a base station apparatus for use in a communication system using a multiplex scheme of TDMA scheme or OFDM scheme.

Incidentally, in the above embodiments, the radio receiver used Rake combining to composite the signals arrived through the paths. However, this is not limitative but the present invention may use any combining method provided that the signals arrived through the paths can be composited based on each antenna.

As described above, according to the present invention, directivity-based delay profiles can be generated on the basis of correlation operating values in the correlation operating sections. Furthermore, it is possible to provide a path search circuit which can arbitrarily set a spatial resolution by increasing the number of the weight multiplying sections in the rear stage of the correlation operating section. This method is less in operation amount than increasing the number of directional beams in the rear stage of a radio receiving section to carry out correlating operation corresponding to the number of beams and, thereafter, further calculate a delay profile. This does not require unnecessary increasing the scale of hardware. Due to this, even where carrying out path search by using directional beams, it is possible to reduce the dependency of path arrival direction and detect a direction and timing of path with accuracy regardless of from which direction a path is to arrive.

What is claimed:

1. A path search circuit comprising:
    (a) an orthogonal multi-beam forming section for multiplying a plurality of base band signals obtained by demodulating a plurality of radio-frequency signals received by a plurality of antennas respectively in a plurality of radio receiving sections by a first weight concerned with a plurality of mutually orthogonal directivities;
    (b) a correlation operating section for correlation-operating outputs of the orthogonal multi-beam forming section with a predetermined signal;
    (c) a weight multiplying section for multiplying an output of the correlation operating section by a second weight;
    (d) a delay profile generating section for generating a delay profile from an output signal of the weight multiplying section; and
    (e) a path detecting section for detecting a reception timing and arrival direction of an arriving path from the delay profile.

2. A path search circuit according to claim 1, comprising a beam selecting section for comparing output levels of the correlation operating section, and selecting and outputting only a predetermined number of outputs of the correlating operating section,
    the weight multiplying section multiplying the second weight on the selected outputs of the correlation operating section by the beam selecting section.

3. A path search circuit according to claim 1, wherein the second weight is a weight for forming directivities different in main beam direction,
    comprising a delay profile power-combining section for power-combining a plurality of delay profiles generated by the delay profile generating section,
    the path detecting section detecting a reception timing of the arriving path from an output of the delay profile power combining section.

4. A path search circuit according to claim 1, wherein the second weight is a weight for forming directivities different in main beam direction,
    the path detecting section selecting a maximum power value, in each reception timing, from a plurality of the delay profiles thereby detecting the arrival direction.

5. A path search circuit according to claim 1, wherein the second weight is a weight for forming directivities different in main beam direction,
    the path detecting section selecting a maximum power value, in each reception timing, from a plurality of the delay profiles thereby detecting the arrival direction, and detecting a reception timing of the arriving path from a delay profile generated on the basis of the maximum power value in each reception timing.

6. A path search circuit according to claim 1, wherein the second weight is a weight for forming directivities different in main beam direction,
    comprising a delay profile power combining section for power-combining a plurality of delay profiles generated in the delay profile generating section,
    the path detecting section detecting a reception timing of the arriving path from an output of the delay profile power combining section, and estimating an arrival direction on the basis of an output of the weight multiplying section in each reception timing of the arriving path.

7. A path search circuit according to claim 1, wherein the second weight is a weight for forming directivities different in main beam direction,
    the path detecting section detecting, from a plurality of the delay profiles, reception timings of arriving paths in the number exceeding a maximum number of paths in higher power rank for use in combining arriving path power, estimating an arrival direction on the basis of a plurality of outputs of the weight multiplying section in each arriving path reception timing, and detecting reception timings and arrival directions of arriving paths equal to or less than the maximum number of paths in a higher order of directional reception power to the arrival direction.

8. A path search circuit according to claim 1, wherein the second weight is a weight for forming directivities different in main beam direction,
    comprising a delay profile power-combining section for power-combining a plurality of delay profiles generated in the delay profile generating section,
    the path detecting section detecting, from outputs of the delay profile power-combining section, reception timings of arriving paths in the number exceeding a maximum number of paths in higher power rank for use in combining arriving path power, estimating an arrival direction on the basis of a plurality of outputs of the weight multiplying section in each arriving path reception timing, and detecting reception timings and arrival directions of arriving paths equal to or less than the maximum number of paths in a higher order of directional reception power to the arrival direction.

9. A path search circuit according to claim 1, comprising
    an angle-spread calculating section for calculating an angle spread in an arrival direction of arriving path detected by the path detecting section, and
    an angle spread determining section for taking an average value in the arrival direction of arriving path as an arrival direction for all the paths when the angle spread is smaller than a predetermined value.

10. A path search circuit according to claim 1, wherein the first weight is multiplied with a correction coefficient for correcting amplitude phase variation between the plurality of radio receiving sections.

11. A path search circuit according to claim 1, wherein the first weight is multiplied with a correction coefficient for correcting coupling between antenna elements structuring the antenna.

12. A path search circuit according to claim 1, wherein the delay profile is an average of delay profiles generated in a predetermined number of times by the delay profile generating section.

13. A path search circuit comprising:
  (a) a correlation operating section for carrying out correlation operation of a plurality of base band signals obtained by demodulating a plurality of radio-frequency signals received at a plurality of antennas respectively in a plurality of radio receiving sections, with a signal predetermined for the base band signal;
  (b) an orthogonal multi-beam forming section for multiplying a third weight concerning a plurality of directivities mutually orthogonal to an output of the correlation operating section;
  (c) a weight multiplying section for multiplying a fourth weight on an output of the orthogonal multi-beam forming section;
  (d) a delay profile generating section for generating a delay profile from an output signal of the weight multiplying section; and
  (e) a path detecting section for detecting a reception timing and arrival direction of an arriving path from the delay profile.

14. A path search circuit according to claim 13, comprising a beam selecting section for comparing output levels of the orthogonal multi-beam forming section, and selecting and outputting a predetermined number of outputs only of the orthogonal multi-beam forming section,
  the weight multiplying section multiplying the fourth weight on the outputs of the orthogonal multi-beam forming section the beam selecting section has selected.

15. A path search circuit according to claim 13, wherein the fourth weight is a weight for forming directivities different in main beam direction, comprising a delay profile power combining section for power-combining a plurality of delay profiles generated by the delay profile generating section,
  the path detecting section detecting a reception timing of the arriving path from an output of the delay profile power-combining section.

16. A path search circuit according to claim 13, wherein the fourth weight is a weight for forming directivities different in main beam direction, the path detecting section selecting a maximum power value, in each reception timing, from a plurality of the delay profiles thereby detecting an arrival direction.

17. A path search circuit according to claim 13, wherein the fourth weight is a weight for forming directivities different in main beam direction, the path detecting section selecting a maximum power value, in each reception timing, from a plurality of the delay profiles thereby detecting an arrival direction, and detecting a reception timing of the arriving path from a delay profile generated on the basis of the maximum power value in each reception timing.

18. A path search circuit according to claim 13, wherein the fourth weight is a weight for forming directivities different in main beam direction, comprising a delay profile power combining section for power-combining a plurality of delay profiles generated in the delay profile generating section,
  the path detecting section detecting a reception timing of the arriving path from an output of the delay profile power-combining section, and estimating an arrival direction on the basis of an output of the weight multiplying section in each reception timing of the arriving path.

19. A path search circuit according to claim 13, wherein the fourth weight is a weight for forming directivities different in main beam direction, the path detecting section detecting, from a plurality of the delay profiles, reception timings of arriving paths in the number exceeding a maximum number of paths in higher power rank for use in combining arriving path power, estimating an arrival direction on the basis of a plurality of outputs of the weight multiplying section in each arriving path reception timing, and detecting reception timings and arrival directions of arriving paths equal to or less than the maximum number of paths in a higher order of directional reception power to the arrival direction.

20. A path search circuit according to claim 13, wherein the fourth weight is a weight for forming directivities different in main beam direction, comprising a delay profile power combining section for power-combining a plurality of delay profiles generated by the delay profile generating section,
  the path detecting section detecting, from outputs of the delay profile power combining section, reception timings of arriving paths in the number exceeding a maximum number of paths in higher power rank for use in combining arriving path power, estimating an arrival direction on the basis of a plurality of outputs of the weight multiplying section in each arriving path reception timing, and detecting reception timings and arrival directions of arriving paths equal to or less than the maximum number of paths in a higher order of directional reception power to the arrival direction.

21. A path search circuit according to claim 13, comprising
  an angle-spread calculating section for calculating an angle spread in arrival direction of the arriving paths detected by the bath detecting section, and
  an angle spread determining section for taking an average value in arrival direction of the arriving paths as an arrival direction of all the paths when the angle spread is smaller than a predetermined value.

22. A path search circuit according to claim 13, wherein the third weight is multiplied with a correction coefficient for correcting amplitude phase variation between the plurality of radio receiving sections.

23. A path search circuit according to claim 13, wherein the third weight is multiplied with a correction coefficient for correcting coupling between antenna elements structuring the antenna.

24. A path search circuit according to claim 13, wherein the delay profile is an average of delay profiles generated in a predetermined number of times by the delay profile generating section.

25. A radio receiver comprising:
  an antenna signal input section for inputting a signal from a plurality of antennas;
  a plurality of radio receiving sections for demodulating a radio frequency signal inputted to the antenna input section into a base band signal;
  an orthogonal multi-beam forming section for multiplying the base band signal by a first weight concerned with a plurality of mutually orthogonal directivities;
  a correlation operating section for correlation-operating outputs of the orthogonal multi-beam forming section with a predetermined signal;
  a weight multiplying section for multiplying an output of the correlation operating section by a second weight;
  a delay profile generating section for generating a delay profile from an output signal of the weight multiplying section;

a path detecting section for detecting a reception timing and arrival direction of an arriving path from the delay profile;

a path separating section for separating a path from the base band signal in a reception timing of arriving path detected by the path detecting section;

a path reception beam generating section for forming a directional beam in an arrival direction of the arriving path for each path separated by the path separating section; and a path combining section for combining and receiving output signals of the path reception beam generating section.

26. A radio receiver according to claim 25, wherein the path reception beam generating section forms a directional beam in a path arrival direction providing a maximum signal-to-noise ratio from the delay profile.

27. A radio receiver according to claim 25, wherein the path reception beam generating section forms a directional beam in a path arrival direction providing a maximum reception power from the delay profile.

28. A radio receiver comprising:

an antenna signal input section for inputting a signal from a plurality of antennas;

a plurality of radio receiving sections for demodulating a radio frequency signal inputted to the antenna input section into a base band signal;

a correlation operating section for correlation-operating the base band signal with a predetermined signal;

an orthogonal multi-beam forming section for multiplying a third weight concerned with a plurality of mutually orthogonal directivities on an output of the correlation operating section;

a weight multiplying section for multiplying outputs of the orthogonal multi-beam forming section by a fourth weight;

a delay profile generating section for generating a delay profile from an output signal of the weight multiplying section;

a path detecting section for detecting a reception timing and arrival direction of an arriving path from the delay profile;

a path separating section for separating a path from the base band signal in a reception timing of arriving path detected by the path detecting section;

a path reception beam generating section for forming a directional beam in an arrival direction of the arriving path for each path separated by the path separating section; and a path combining section for combining and receiving output signals of the path reception beam generating section.

29. A radio receiver according to claim 28, wherein the path reception beam generating section forms a directional beam in a path arrival direction providing a maximum signal-to-noise ratio from the delay profile.

30. A radio receiver according to claim 28, wherein the path reception beam generating section forms a directional beam in a path arrival direction providing a maximum reception power from the delay profile.

31. A radio transmitter comprising:

an antenna signal input section for inputting a signal from a plurality of antennas; a plurality of radio receiving sections for demodulating a radio frequency signal inputted to the antenna input section into a base band signal;

an orthogonal multi-beam forming section for multiplying the base band signal by a first weight concerned with a plurality of mutually orthogonal directivities;

a correlation operating section for correlation-operating outputs of the orthogonal multi-beam forming section with a predetermined signal;

a weight multiplying section for multiplying a second weight on an output of the correlation operating section;

a delay profile generating section for generating a delay profile from an output signal of the weight multiplying section;

a path detecting section for detecting a reception timing and arrival direction of an arriving path from the delay profile;

a directional beam transmitting section for forming and transmitting a directional beam in an arrival direction of an arriving path detected by the path detecting section.

32. A radio transmitter according to claim 31, wherein the directional beam transmitting section forms and transmits a directional beam in a path direction of a maximum reception power of among the arriving paths.

33. A radio transmitter according to claim 31, wherein the directional beam transmitting section forms and transmits a directional beam in path directions of a predetermined number in higher rank of reception power of among the arriving paths.

34. A radio transmitter according to claim 31, wherein the directional beam transmitting section forms and transmits a directional beam in an average arriving path direction of the arriving paths.

35. A radio transmitter comprising:

an antenna signal input section for inputting a signal from a plurality of antennas;

a plurality of radio receiving sections for demodulating a radio frequency signal inputted to the antenna input section into a base band signal;

a correlation operating section for correlation-operating the base band signal with a predetermined signal;

an orthogonal multi-beam forming section for multiplying a third weight concerned with a plurality of mutually orthogonal directivities on an output of the correlation operating section;

a weight multiplying section for multiplying an each output of the orthogonal multi-beam forming section by a fourth weight;

a delay profile generating section for generating a delay profile from an output signal of the weight multiplying section;

a path detecting section for detecting a reception timing and arrival direction of an arriving path from the delay profile; and a directional beam transmitting section for forming and transmitting a directional beam in an arrival direction of an arriving path detected by the path detecting section.

36. A radio transmitter according to claim 35, wherein the directional beam transmitting section forms and transmits a directional beam in a path direction of a maximum reception power of the arriving paths.

37. A radio transmitter according to claim 35, wherein the directional beam transmitting section forms and transmits a directional beam in path directions of a predetermined number in higher rank of reception power of among the arriving paths.

38. A radio transmitter according to claim 35, wherein the directional beam transmitting section forms and transmits a directional beam in an average arriving path direction of the arriving paths.

* * * * *

UNITED STATES PATENT AND TRADEMARK OFFICE
CERTIFICATE OF CORRECTION

| | |
|---|---|
| PATENT NO. | : 7,088,956 B2 |
| APPLICATION NO. | : 10/411344 |
| DATED | : August 8, 2006 |
| INVENTOR(S) | : T. Kishigami et al. |

It is certified that error appears in the above-identified patent and that said Letters Patent is hereby corrected as shown below:

Column 7, line 53, "a quarature beam pattern" should read --an orthogonal beam pattern--

Signed and Sealed this

Ninth Day of January, 2007

JON W. DUDAS
*Director of the United States Patent and Trademark Office*